(12) United States Patent  (10) Patent No.: US 7,543,874 B2
Ogura et al.  (45) Date of Patent: Jun. 9, 2009

(54) VEHICULAR SLIDING CONSOLE

(75) Inventors: Mitsuo Ogura, Aichi-ken (JP); Minoru Shibata, Aichi-ken (JP); Naoki Omatsu, Aichi-ken (JP); Shinji Kumazawa, Toyota (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 12/000,211

(22) Filed: Dec. 11, 2007

(65) Prior Publication Data

US 2008/0143134 A1 Jun. 19, 2008

(30) Foreign Application Priority Data

Dec. 18, 2006 (JP) .............................. 2006-340164
Sep. 6, 2007 (JP) .............................. 2007-231679

(51) Int. Cl.
*B60R 7/04* (2006.01)
(52) U.S. Cl. .................................. 296/37.8; 296/24.34
(58) Field of Classification Search ................. 296/37.8, 296/24.34
See application file for complete search history.

(56) References Cited

U.S. PATENT DOCUMENTS 6,135,529 A * 10/2000 De Angelis et al. ........ 296/37.8
6,726,267 B2 * 4/2004 Kim et al. ................. 296/24.34

FOREIGN PATENT DOCUMENTS

JP   A-62-194955    8/1987
JP   A-2000-255324  9/2000
JP   A-2000-264132  9/2000

* cited by examiner

*Primary Examiner*—Joseph D Pape
(74) *Attorney, Agent, or Firm*—Posz Law Group, PLC

(57) ABSTRACT

A center console is provided with a movable console, a guide rail and an actuation mechanism. A rail main body of the guide rail and a lock member of the actuation mechanism lock the movable console against movement. An operation lever is provided in an upper portion of the movable console. The movable console locked by the rail main body and the lock member of the actuation mechanism is unlocked by operating the operation lever along a moving direction of the movable console.

7 Claims, 15 Drawing Sheets

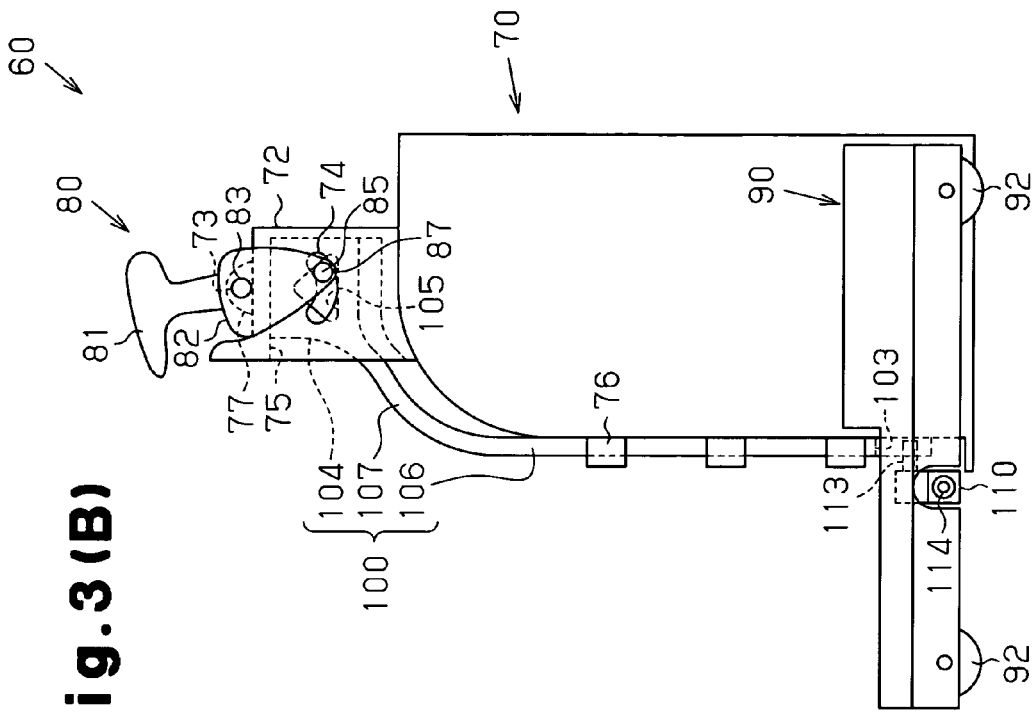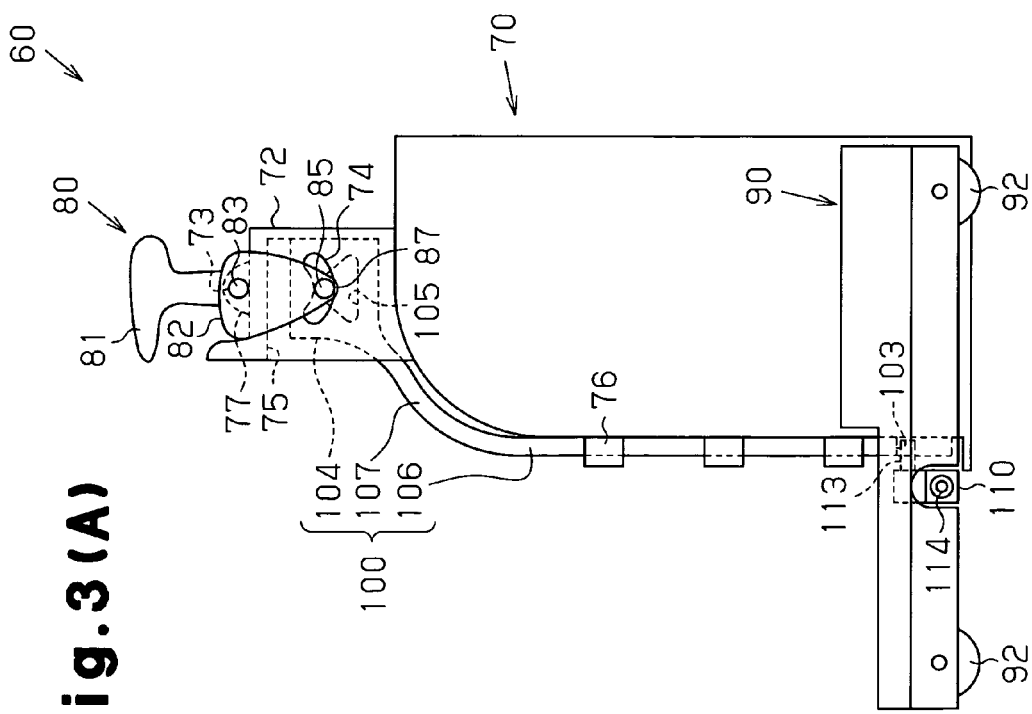

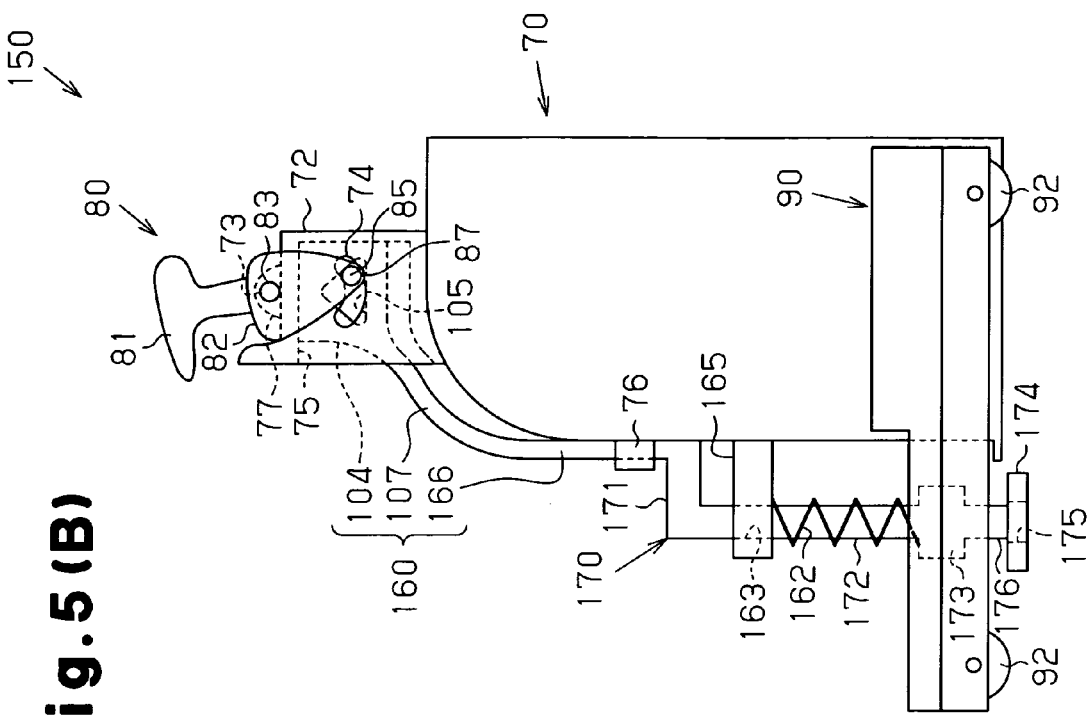
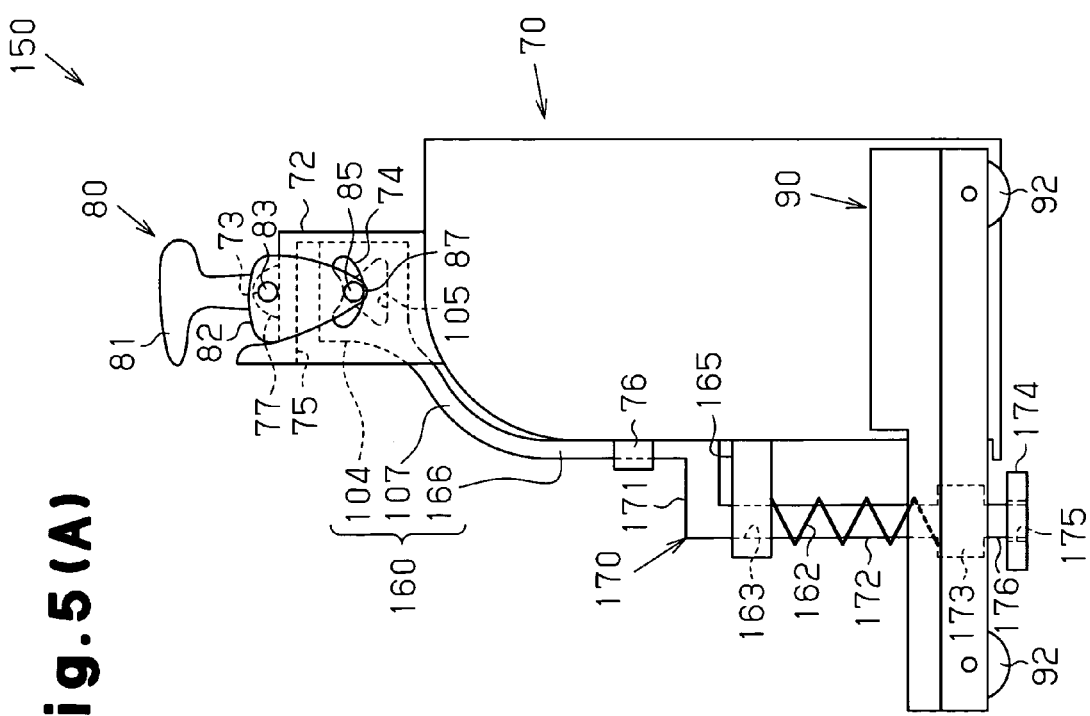

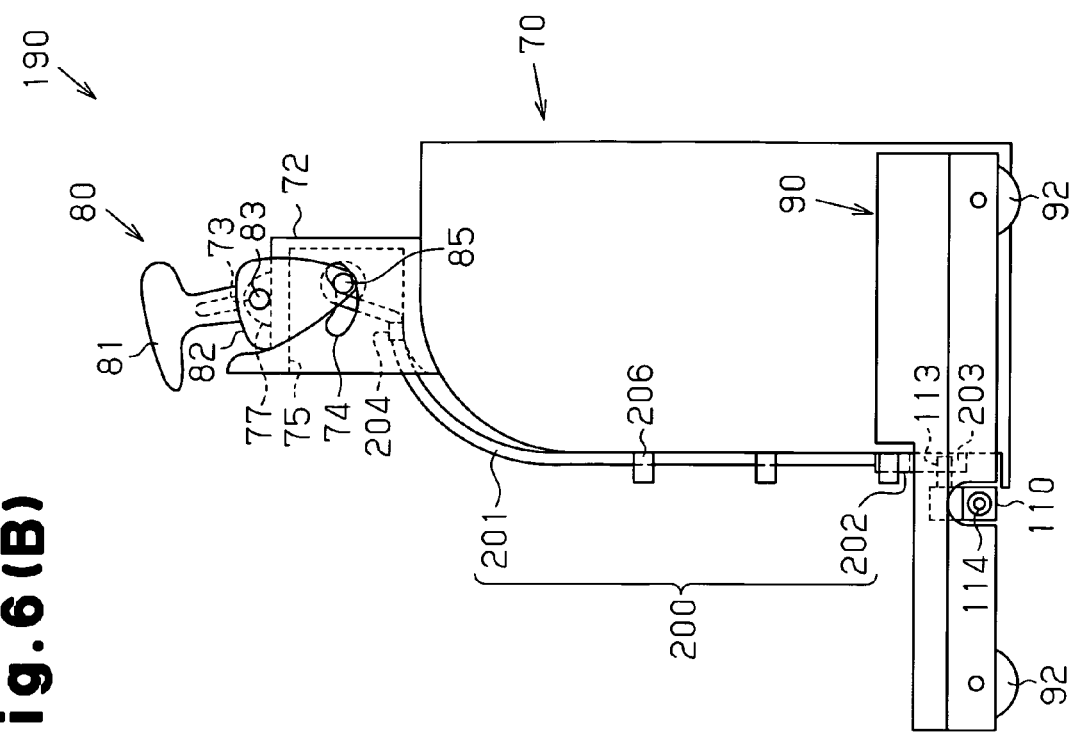
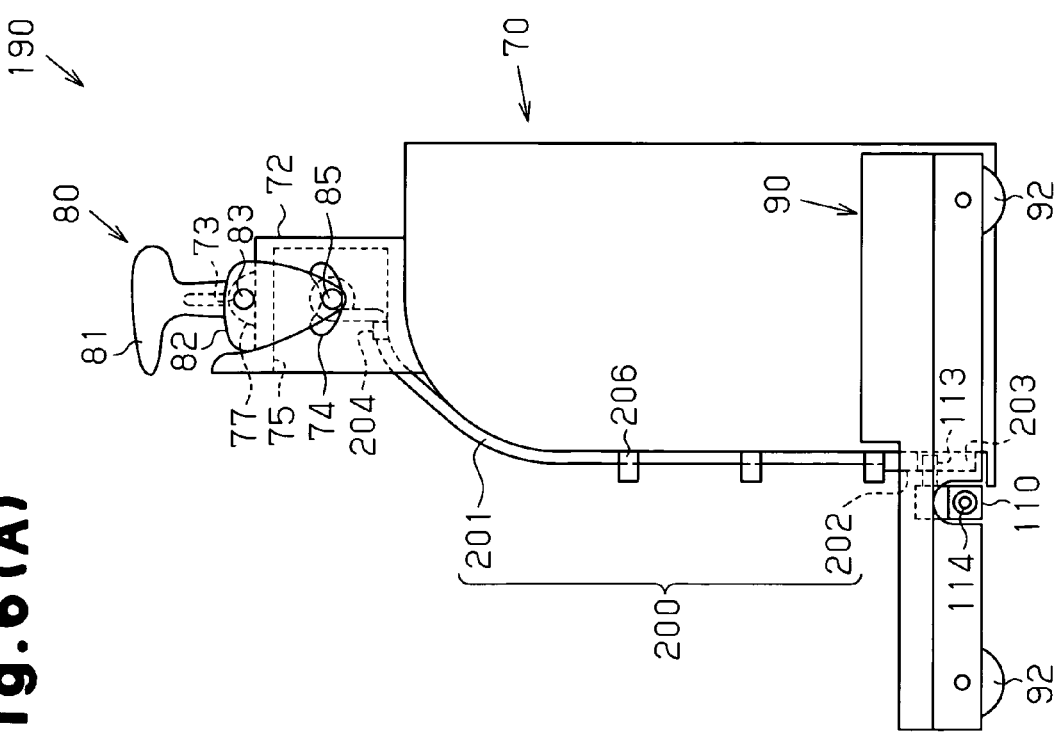

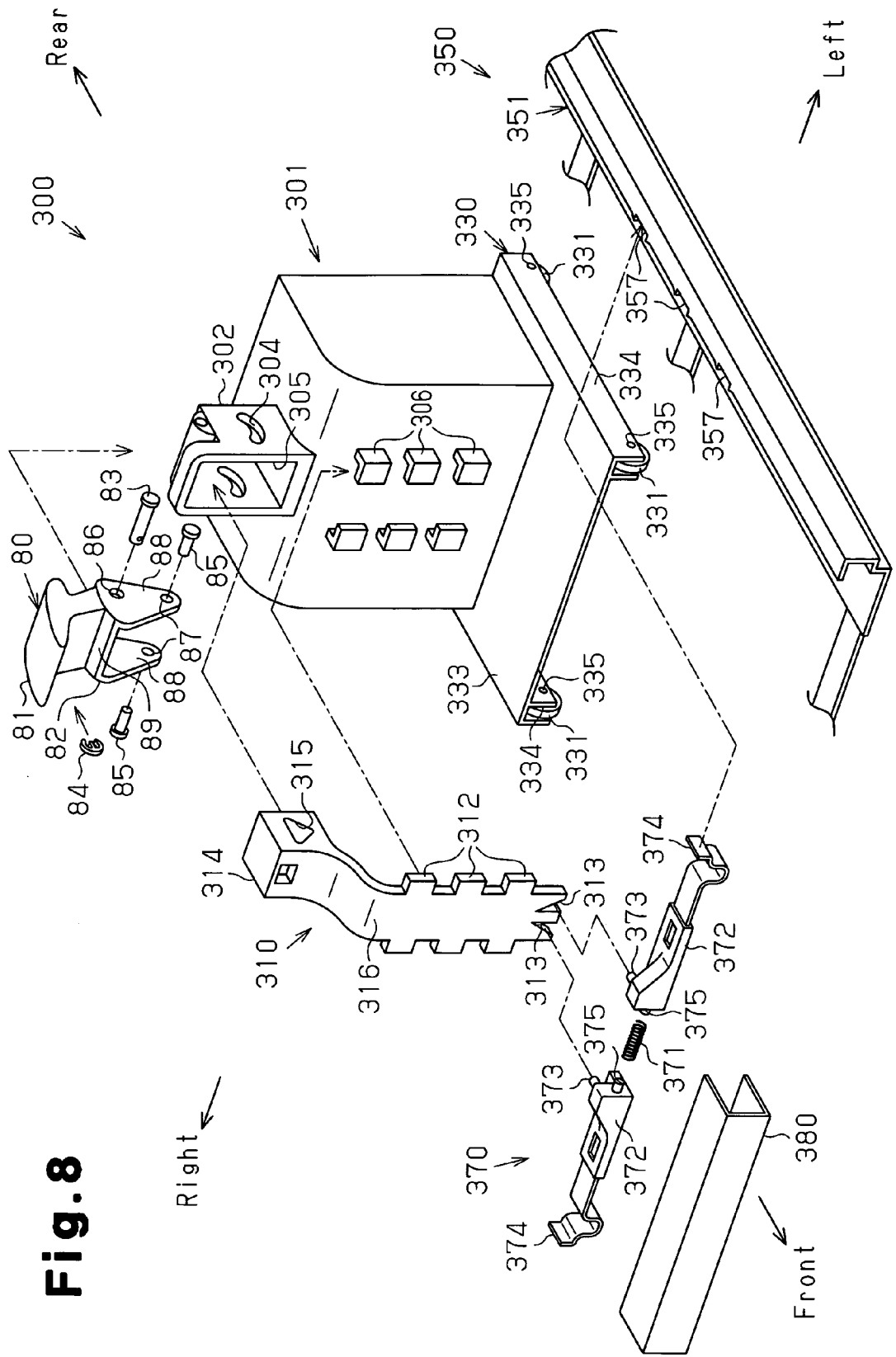

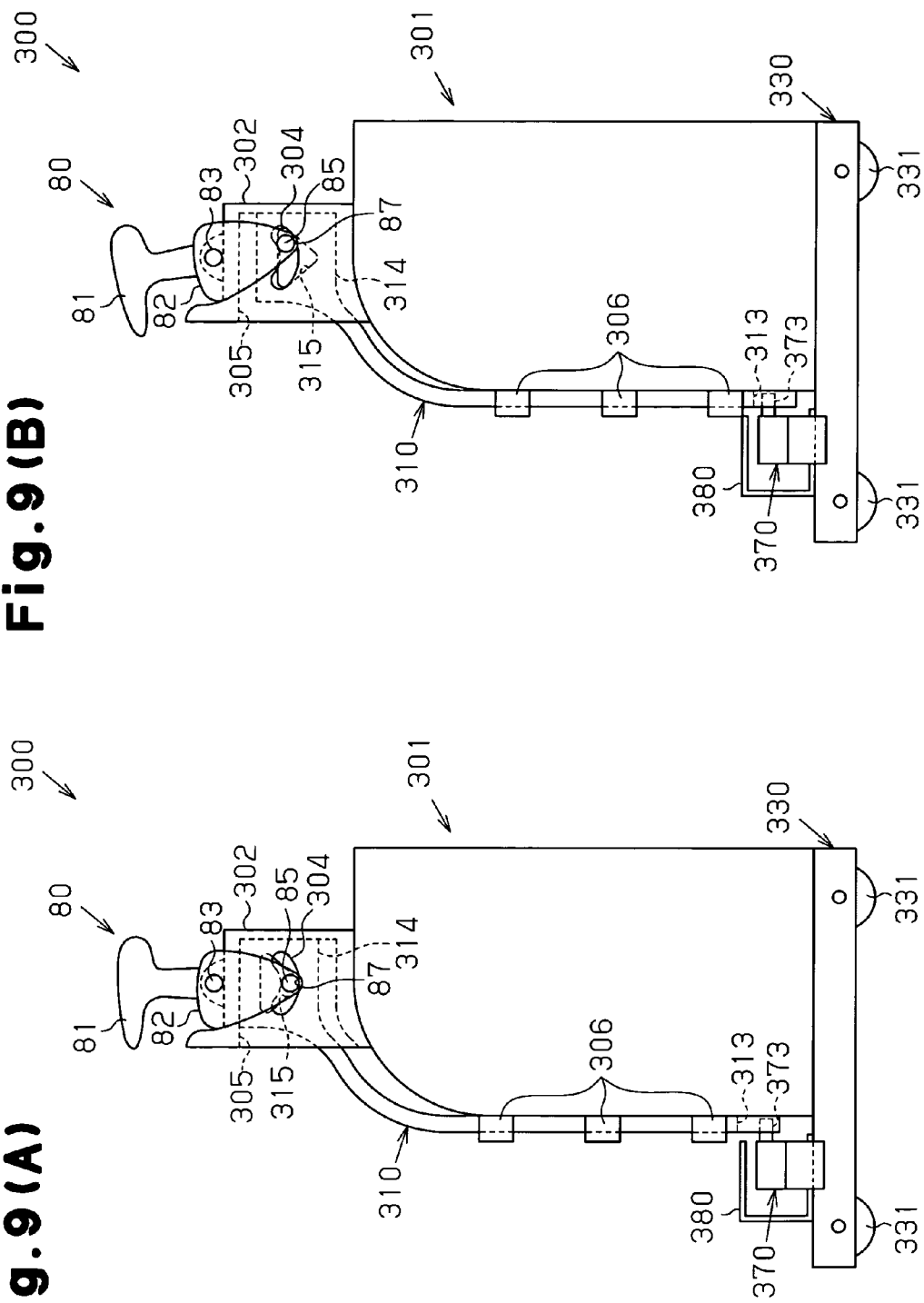

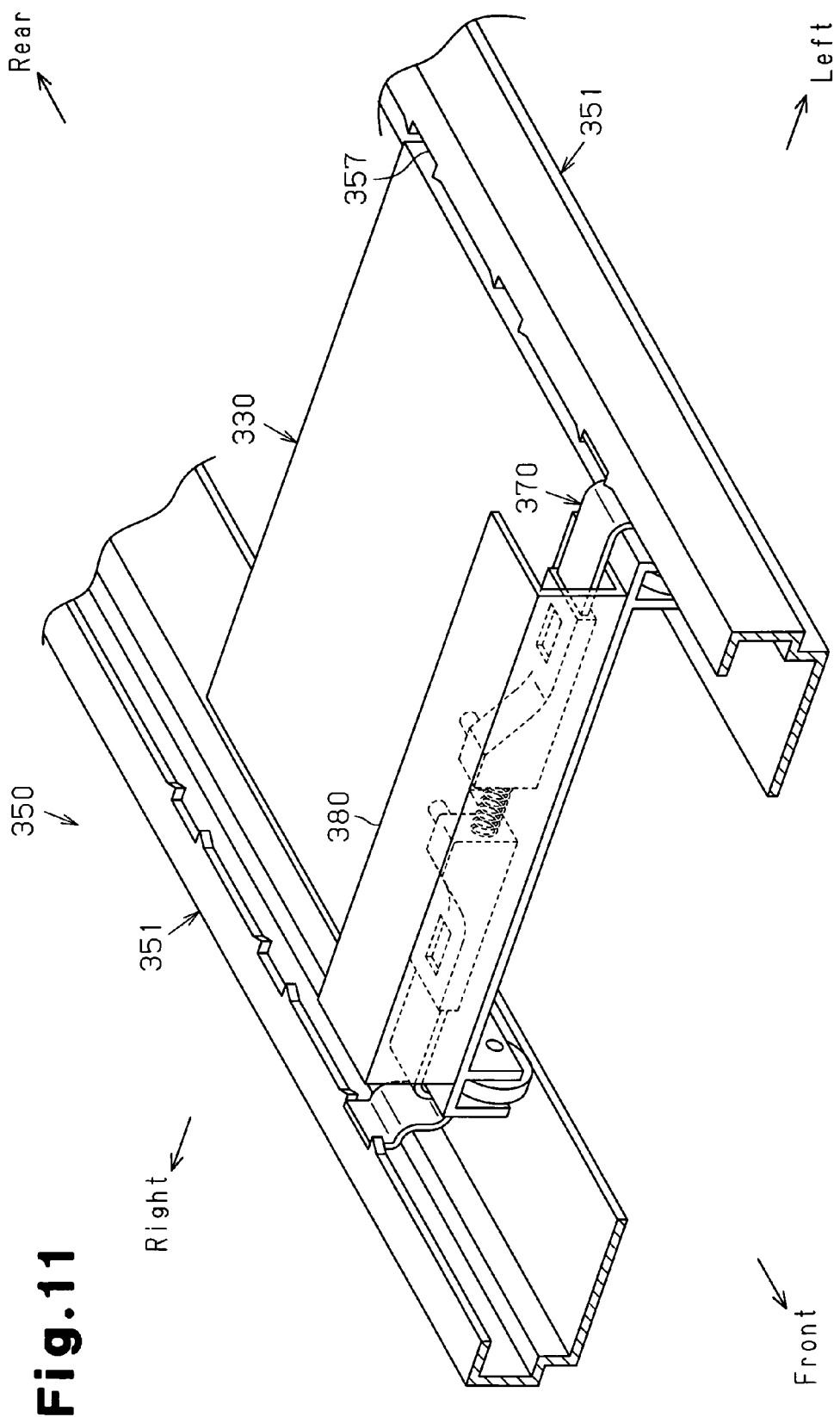

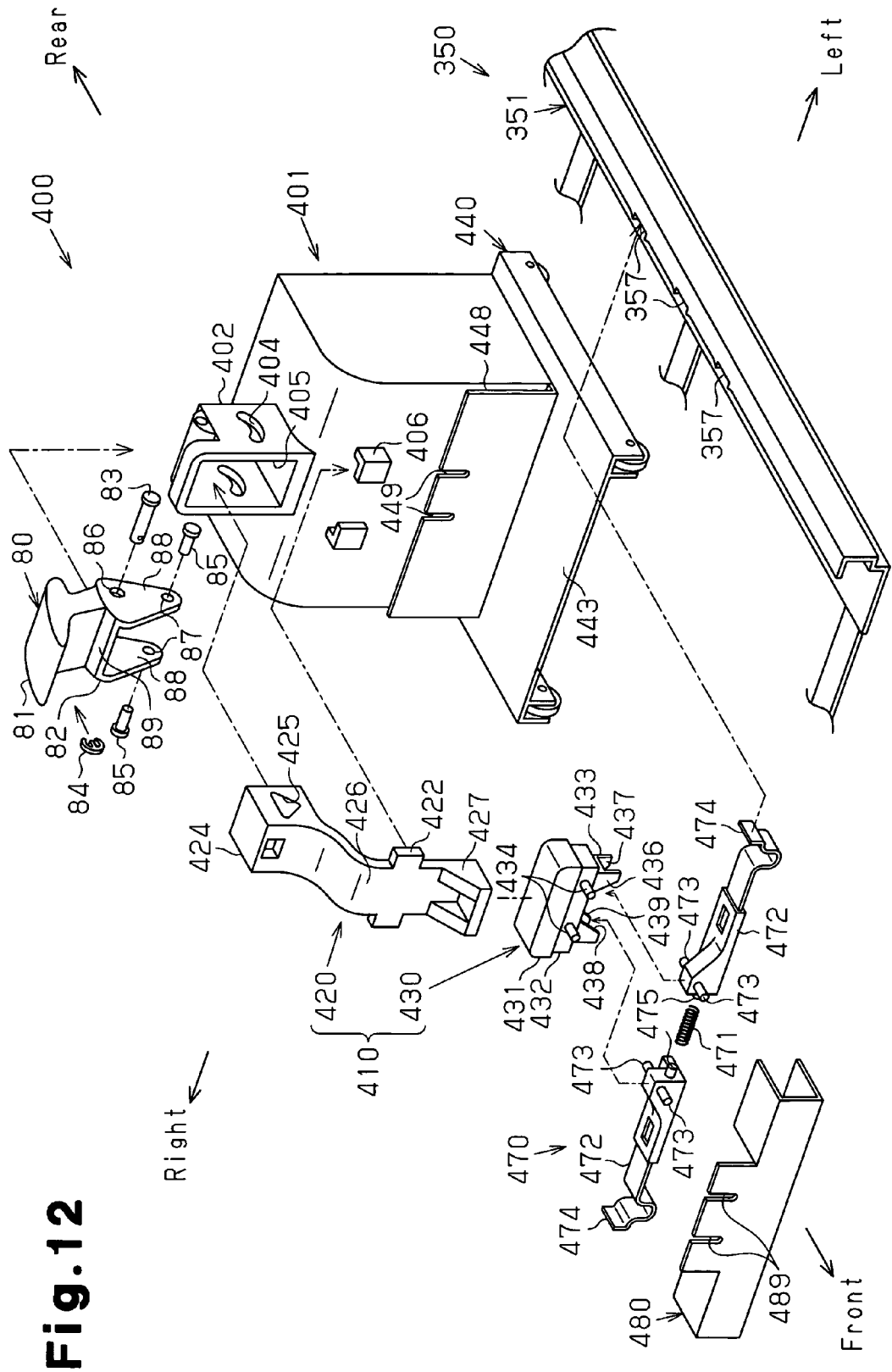

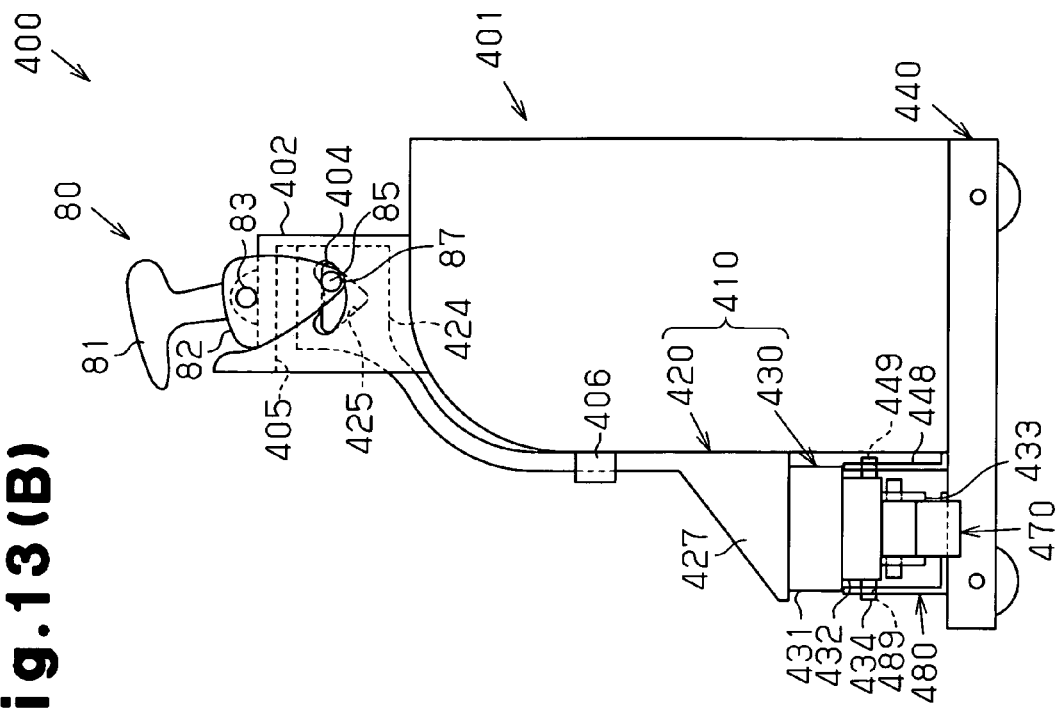
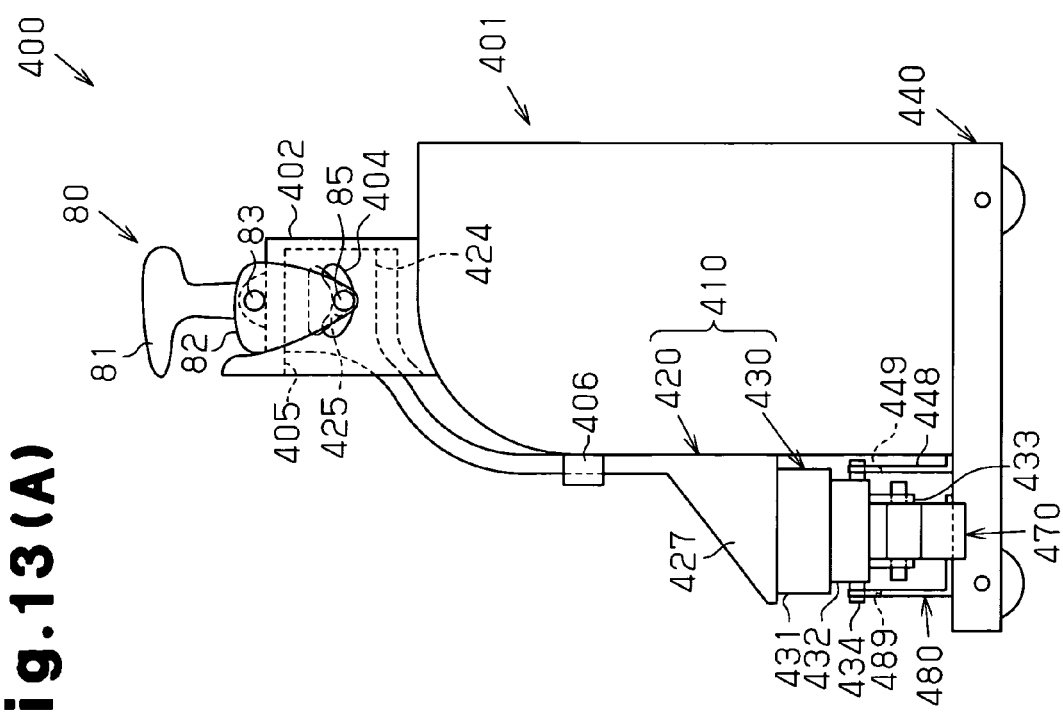

US 7,543,874 B2

VEHICULAR SLIDING CONSOLE

BACKGROUND OF THE INVENTION

The present invention relates to a vehicular sliding console.

In recent years, in vehicles such as multi purpose vehicles (MPV) and sport utility vehicles (SUV), a sliding console, which is movable in a vehicle longitudinal direction, has been employed as a console arranged in the center of the vehicle to improve convenience.

For example, sliding consoles disclosed in Japanese Laid-Open Patent Publication No. 2000-264132, Japanese Patent No. 3621599, and Japanese Laid-Open Patent Publication No. 62-194955 are each provided with a console main body, and a guide rail movably supporting the console main body. A lower portion of the console main body is provided with wheels rolling along the guide rail fixed to a floor panel of the vehicle, and a lock mechanism locking movement of the console main body with respect to the guide rail. The console main body is provided with an engagement portion engaging with a groove or a hole provided in the guide rail. The lock mechanism is operated with an operation lever provided in the console main body.

In the sliding consoles disclosed in Japanese Laid-Open Patent Publication No. 2000-264132 and Japanese Patent No. 3621599, the console main body locked by the lock mechanism is unlocked by moving a latch upward through the operation of the lever so that the latch is disengaged from the engagement hole of the guide rail. A recess is provided on a rear side surface of the console main body, and the operation lever is attached to the recess.

In the sliding console disclosed in Japanese Laid-Open Patent Publication No. 62-194955, a lever for unlocking is connected to a block engaged with the lock groove of the guide rail with a wire. In accordance with the operation of the lever, the block engaged with the lock groove is pulled up, and the console main body is unlocked. The lever is provided on a rear side surface of the console main body. The block is pulled upward by rotating the handle rearward, and the console main body is unlocked.

In the case of the sliding consoles disclosed in the publications, the operation lever is provided on a rear side surface or a rear surface of the console main body. Accordingly, an occupant seated near the operation lever of the console main body can easily operate the operation lever. However, other occupants cannot easily operate the operation lever.

Accordingly, an operation lever may be provided on an upper surface of the console main body. In the case of the consoles disclosed in Japanese Laid-Open Patent Publication No. 2000-264132 and Japanese Patent No. 3621599, if the operation lever is arranged on the upper surface of the console main body, the latch is moved upward by pulling the operation lever upward, and the console main body is unlocked. Further, in the case of the console disclosed in Japanese Laid-Open Patent Publication No. 62-194955, if the handle is arranged on the upper surface of the console, the block is pulled upward by pulling the handle upward, and the console main body is unlocked. However, since an operating direction of the lever does not agree with a moving direction of the console main body in accordance with these methods, it is impossible to smoothly carry out the operation from the unlocking of the console main body to the moving of the console main body.

SUMMARY OF THE INVENTION

An objective of the present invention is to provide a sliding console that allows a smooth operation from unlocking to moving of a console main body, even in the case that an operation lever is provided in an upper portion of the console main body.

To achieve the foregoing objective and in accordance with one aspect of the present invention, a vehicular sliding console including a console main body, a moving mechanism, a lock mechanism and an operation lever is provided. The console main body is supported to be movable relative to a vehicle. The moving mechanism moves the console main body. The lock mechanism locks movement of the console main body by limiting movement of the moving mechanism. The operation lever is provided in an upper portion of the console main body and provided for unlocking the console main body locked by the lock mechanism. The console main body locked by the lock mechanism is unlocked by operating the operation lever along a moving direction of the console main body.

BRIEF DESCRIPTION OF THE DRAWINGS

FIG. 3(A) is a side view schematically showing the actuation mechanism of the center console in a locked state;

FIG. 3(B) is a side view schematically showing the actuation mechanism of the center console in an unlocked state;

FIG. 5(A) is a side view schematically showing an actuation mechanism of a center console in accordance with a second embodiment in a locked state;

FIG. 5(B) is a side view schematically showing the actuation mechanism of the center console in an unlocked state;

FIG. 6(A) is a side view schematically showing an actuation mechanism of a center console in accordance with a third embodiment in a locked state;

FIG. 6(B) is a side view schematically showing the actuation mechanism of the center console in accordance with the third embodiment in an unlocked state;

FIG. 8 is an exploded perspective view of an actuation mechanism of a center console in accordance with a fifth embodiment and a perspective view of a rail main body;

FIG. 9(A) is a side view schematically showing the actuation mechanism of the center console in a locked state;

FIG. 9(B) is a side view schematically showing the actuation mechanism of the center console in an unlocked state;

FIG. 11 is a perspective view showing a guide rail of the center console, a carriage of the actuation mechanism, a lock cover and the lock member in an assembled state;

FIG. 12 is an exploded perspective view showing an actuation mechanism of a center console in accordance with a sixth embodiment and a perspective view of a rail main body;

FIG. 13(A) is a side view schematically showing the actuation mechanism of the center console in a locked state;

FIG. 13(B) is a side view schematically showing the actuation mechanism of the center console in an unlocked state;

DETAILED DESCRIPTION OF THE PREFERRED EMBODIMENTS

First Embodiment

A description will be given below of a sliding console according to a first embodiment of the present invention with reference to FIGS. 1 to 4. The sliding console is installed within a passenger compartment of an MPV, SUV or the like. In this description of the present invention, a forward moving direction of the vehicle is referred to as a front side, a backward moving direction is referred to as a rear side, right and left sides with respect to the direction toward the front side of the vehicle are referred to as right and left sides.

Figure 1:
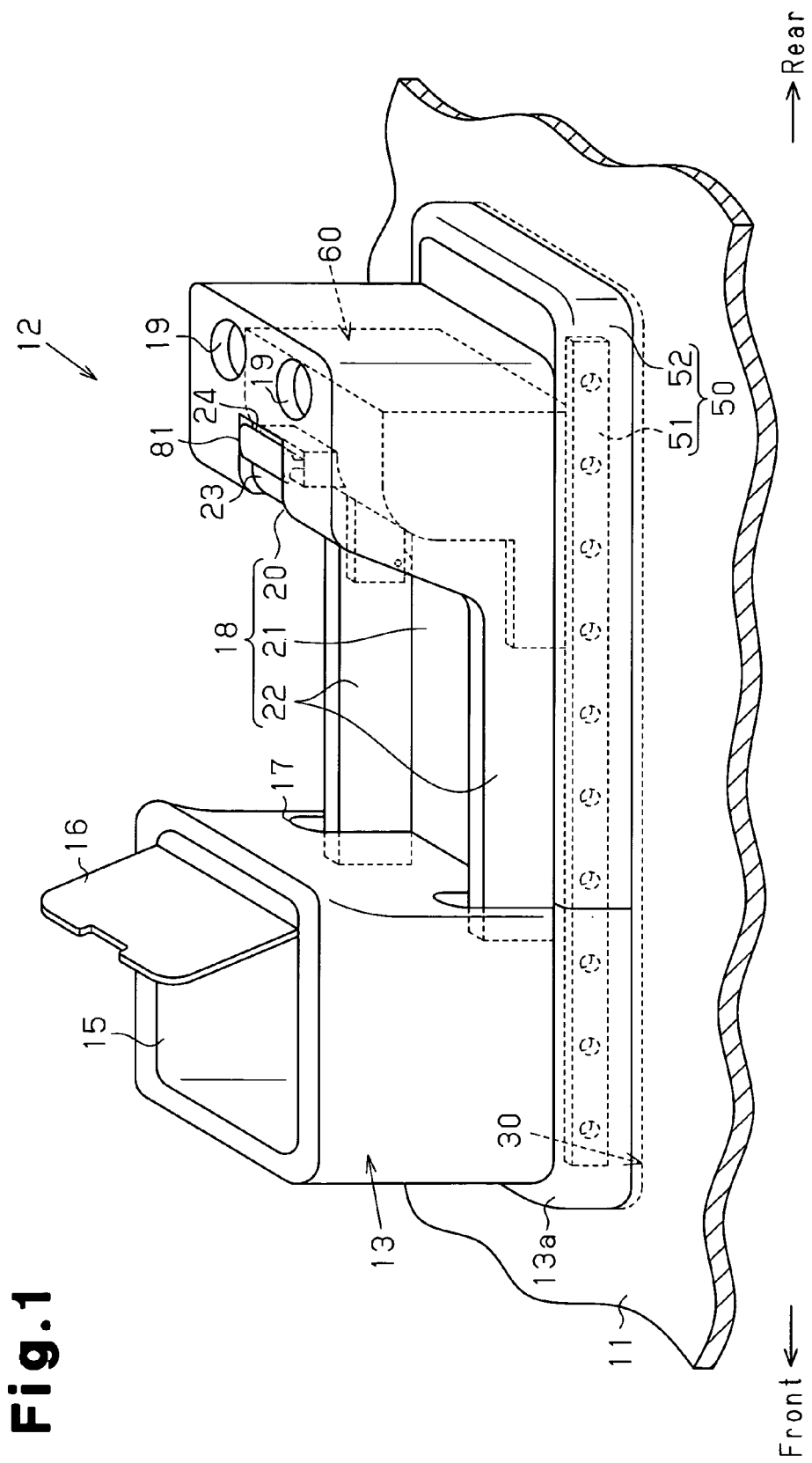
FIG. 1 is a perspective view showing a center console in accordance with a first embodiment of the present invention.

As shown in FIG. 1, a center console 12 is provided in the center of a front portion of a floor 11 of the vehicle. A recess 30 for arranging the center console 12 is formed in the floor 11. The recess 30 is formed in a rectangular shape extending along the vehicle longitudinal direction. A front end of the recess 30 is positioned between a driver seat and a front passenger seat, and a rear end of the recess 30 is positioned near a rear seat. The center console 12 is provided with a fixed console 13 fixed to the floor 11, and a movable console 18 serving as a console main body. The movable console 18 is arranged on a rear side of the fixed console 13, and is slidably supported in the vehicle longitudinal direction. In other words, the movable console 18 is supported to the fixed console 13 so as to contact and separate from the fixed console 13. The center console 12 is provided with a guide rail 50 and an actuation mechanism 60 which serve as a moving mechanism to move the movable console 18.

The fixed console 13 is formed substantially as a rectangular parallelepiped shape. An upper surface of the fixed console 13 is provided with a storage compartment 15 having an opening, and a lid member 16 opening and closing an opening of the storage compartment 15. A pair of guide grooves 17 open rearward are provided in both side portions of the fixed console 13. The fixed console 13 is fixed to the floor 11 while fitting a lower end thereof to a front portion of the recess 30. A front cover 13a is provided in a lower end of the fixed console 13.

The movable console 18 is provided with a movable main body portion 20, a movable bottom portion 21 and a pair of movable side wall portions 22. The movable main body portion 20 has the same level of height as the fixed console 13. The movable bottom portion 21 extends forward from a lower portion of the movable main body portion 20. Each of the movable side wall portions 22 extends upward from both side edges of the movable bottom portion 21. The height of each of the movable side wall portions 22 is substantially half of the height of the movable main body portion 20. The movable main body portion 20, the movable bottom portion 21 and a pair of the movable side wall portions 22 are integrally formed. Each of the movable main body portion 20 and the movable side wall portions 22 is constituted by a hollow body having an opening in a lower surface. At least a part of each of the movable side wall portions 22 is always inserted into a corresponding guide groove 17 regardless of a position in the vehicle longitudinal direction of the movable console 18. In accordance with this structure, in a state in which the movable console 18 slides and the movable main body portion 20 is away from the fixed console 13 rearward, a space surrounded by the movable main body portion 20, the fixed console 13, the movable bottom portion 21 and a pair of movable side wall portions 22 is utilized as the storage compartment. Further, two cup holders 19 which are recessed in a columnar shape are formed on an upper surface of the movable main body portion 20. A lever arrangement portion 23 which is recessed substantially in a rectangular shape is formed in the center of a front surface of the movable main body portion 20. An operation lever 81 operating the movement of the movable console 18 is provided in the center of the lever arrangement portion 23. An upper portion of the operation lever 81 is exposed through an opening portion 24 provided in the center of the lever arrangement portion 23.

The guide rail 50 is provided with a pair of rail main bodies 51, and a rear cover 52 covering a rear portion of both rail main bodies 51. Each of the rail main bodies 51 extends along each of side edges of the recess 30.

The actuation mechanism 60 is covered from above by the movable main body portion 20 and the movable side wall portions 22. The actuation mechanism 60 is coupled to the movable console 18 by a bolt and a nut (now shown). The actuation mechanism 60 is movable along the rail main body 51. Further, the actuation mechanism 60 is engaged with the rail main body 51 so as to be immovably locked. If the actuation mechanism 60 is locked against movement, the movable console 18 is also locked against movement.

Next, a description will be given of the structure of the actuation mechanism 60 and the rail main body 51 with reference to FIG. 2.

Figure 2:
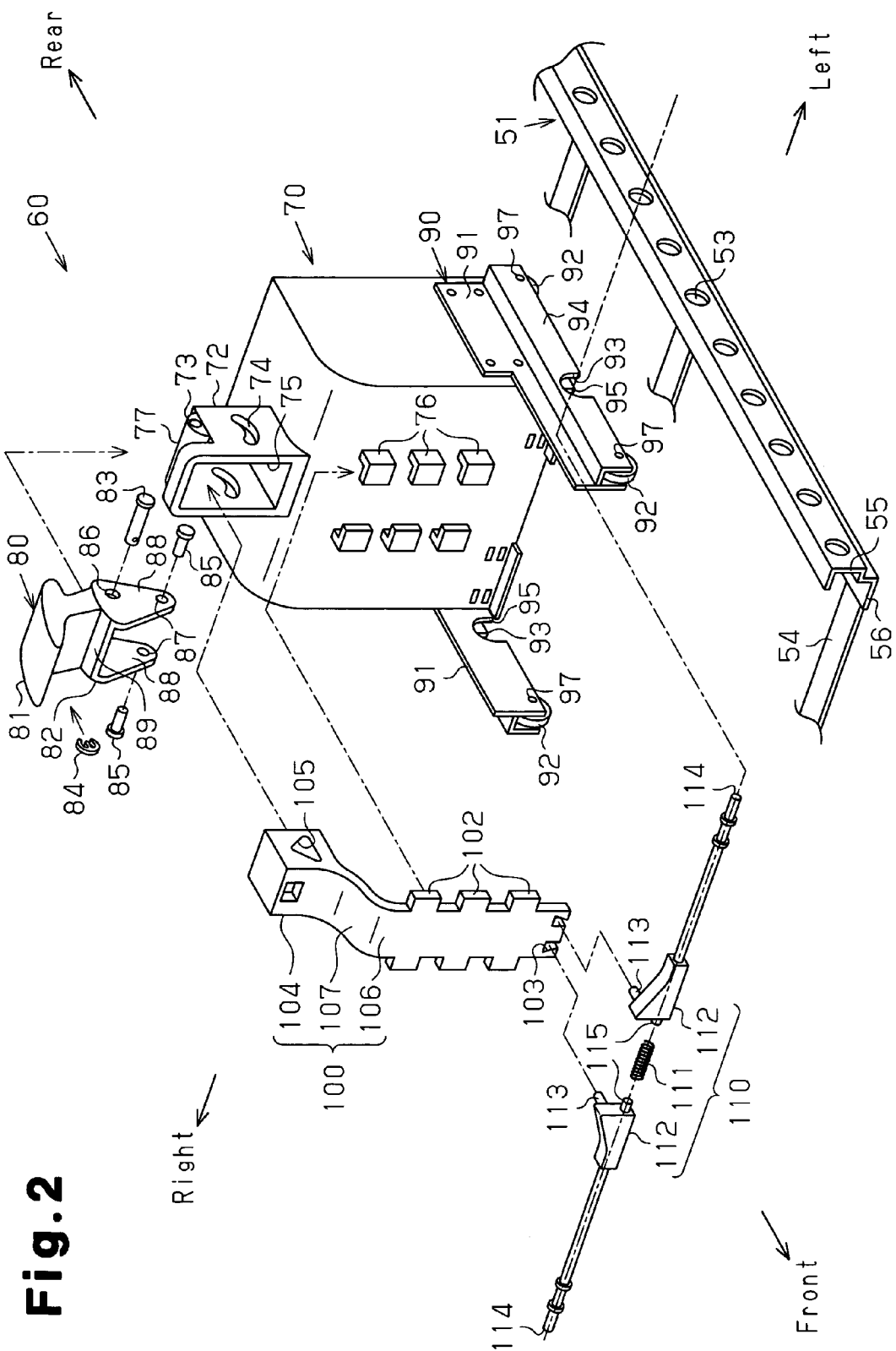
FIG. 2 is an exploded perspective view of an actuation mechanism of the center console and a perspective view of a rail main body.

As shown in FIG. 2, each of the rail main bodies 51 is constituted by a wheel engagement portion 55 having a U-shaped cross section, and a wheel rolling portion 56 having an L-shaped cross section. Each of the wheel engagement portions 55 is arranged in such a manner as to oppose their openings to each other. Each of the wheel rolling portions 56 is provided in a lower portion of the wheel engagement portion 55. A plurality of lock fitting holes 53 are formed in a side surface of the wheel engagement portion 55 so as to be spaced at a uniform interval. Each of the rail main bodies 51 is coupled to each other by a horizontal plate 54 in a state in which the width of a space between both rail main bodies 51 is made fixed.

The actuation mechanism 60 is provided with a main body portion 70, a lever main body 80 and a wheel portion 90. The lever main body 80 is provided with an operation lever 81 inserted to the opening portion 24 of the movable console 18. Further, the actuation mechanism 60 is provided with a lock member 110 fitting to the lock fitting hole 53 of the rail main body 51, and a link mechanism 100 transmitting an operation of the operation lever 81 to the lock member 110.

The main body portion 70 is formed substantially as a rectangular parallelepiped shape. A lever mounting portion 72 is provided in the center of the upper surface of the main body portion 70. A pin supporting portion 77 formed as a semicircular cross sectional shape is provided in an upper portion of the lever mounting portion 72. A first through hole 73 penetrating both side surfaces is formed in the pin supporting portion 77. A pin shaft 83 is inserted to the first through hole 73 of the pin supporting portion 77, and the lever main body 80 is supported to the main body portion 70 in a tiltable manner by this pin shaft 83. The lever mounting portion 72 has an opening portion 75 open forward, and a main body guide groove 74 provided in both side surfaces. The main body guide groove 74 extends along a circular arc which is lowest in a center portion positioned in a vertically below the first through hole 73, and becomes gradually higher from the center portion toward front and rear sides thereof.

A pair of link guide portions 76 are provided in the center of the front surface of the main body portion 70 at each of three positions comprising an upper portion, a center portion and a lower portion of the main body portion 70. The link guide portion 76 protrudes from a front surface of the main body portion 70, and is structured by bending a leading end thereof toward the center. Each of the link guide portions 76 is formed as an L-shaped cross sectional form, and is arranged in such a manner as to oppose to each of the link guide portions 76 forming a pair. The link guide portion 76 pinches a guide engagement portion 102 of the link mechanism 100.

The wheel portion 90 is provided in each of lower portions in both side surfaces of the main body portion 70. Each of the wheel portions 90 is provided with a plate-like main body attaching portion 91, and a rail engagement portion 94 having an L-shaped cross section. The main body attaching portion 91 extends forward of the main body portion 70 from a rear portion of the main body portion 70. The rail engagement portion 94 extends in a horizontal direction from the center of the main body attaching portion 91, and is bent downward. A front-wheel 92 and a rear wheel 92 are attached between the main body attaching portion 91 and the rail engagement portion 94 so as to freely roll with an axle 97. At a time when the actuation mechanism 60 moves along the rail main body 51, the rail engagement portion 94 is engaged with the wheel engagement portion 55 of the rail main body 51, and each of the wheels 92 rolls on the wheel rolling portion 56. Further, the main body attaching portion 91 and the rail engagement portion 94 have substantially semicircular shaped notches 95 and 93 at positions close to the front surface of the main body portion 70. A part of the lock member 110 is arranged within the notches 95 and 93. An upper half of the lever main body 80 is the operation lever 81, and a lower half thereof is the main body coupling portion 82.

The operation lever 81 is formed as a T-shaped cross sectional form for improving the operability. The main body coupling portion 82 is provided with a mounting plate 89, and a pair of side wall plates 88 extending downward from both side portions of the mounting plate 89. The side wall plate 88 is formed as an inverted triangular shape. The side wall plate 88 has a second through hole 86 in an upper portion and a third through hole 87 in a lower portion, respectively.

A protrusion (not shown) is provided in an upper portion of the mounting plate 89, and a recess (not shown) is provided in a lower surface of the operation lever 81. The operation lever 81 is fixed to the main body coupling portion 82 by fitting the protrusion and the recess. The lever main body 80 is mounted on the lever mounting portion 72 in such a manner as to cause the mounting plate 89 to correspond to the lever mounting portion 72 and cause each of the side wall plates 88 to correspond to each of the side surfaces of the lever mounting portion 72. In this state, each of the second through holes 86 of the lever main body 80 is aligned with each of the first through holes 73 of the main body portion 70, and the third through hole 87 is aligned with the main body guide groove 74. The locking portion 84 is fixed to an end portion of the pin shaft 83 which is inserted to the left second through hole 86, the left first through hole 73, the right first through hole 73 and the right second through hole 86 in this order, whereby the lever main body 80 is tiltably supported to the main body portion 70. Further, one fitting pin 85 is inserted to the left side third through hole 87 and the left main body guide groove 74 in this order, and the other fitting pin 85 is inserted to the right third through hole 87 and the right main body guide groove 74 in this order. In a state in which the actuation mechanism 60 is accommodated in the movable console 18, an upper portion of the operation lever 81 is exposed in the lever arrangement portion 23 of the movable console 18.

The link mechanism 100 is provided with a lock coupling portion 106, an inclined portion 107, and a lever coupling portion 104. The lock coupling portion 106 is constituted by a long plate extending along a vertical direction. An end portion of the lock coupling portion 106 is coupled to a lock member 110. The inclined portion 107 is inclined along a front surface of the main body portion 70 from an upper portion of the lock coupling portion 106. The lever coupling portion 104 formed substantially as a rectangular parallelepiped shape is coupled to the lever main body 80 as well as being provided in an upper portion of the inclined portion 107. A pair of guide engagement potions 102 protruding in a horizontal direction are provided in both side portions of the lock coupling portion 106 at each of three positions comprising an upper portion, a center portion and a lower portion. Further, a pair of lock coupling grooves 103 are formed in a lower end of the lock coupling portion 106. Each of the lock coupling grooves 103 is formed as an inverted trapezoidal shape, and is arranged in such a manner that an inner line is vertical and an outer line is inclined. A link guide groove 105 is formed in both side surfaces of the lever coupling portion 104. The link guide groove 105 is formed substantially as a triangular shape. In a state of assembling the actuation mechanism 60, each of the guide engagement portions 102 of the lock coupling portion 106 is sandwiched by a front surface of the main body portion 70 and the link guide portion 76, and the lever coupling portion 104 is accommodated within the opening portion 75 of the lever mounting portion 72. In accordance with this structure, movement in a horizontal direction of the link mechanism 100 is limited, and only movement in a vertical direction is allowed. The link mechanism 100 can be moved between a first state bringing the lower portion of the lever coupling portion 104 into contact with the lower surface of the opening portion 75, and a second state bringing it into contact with the upper surface of the opening portion 75. In the first state, the top portion of the link guide groove 105 is aligned with the bottom portion of the main body guide groove 74, and the fitting pin 85 inserted to the third through hole 87 and the main body guide groove 74 is locked to the link guide groove 105.

The lock member 110 is provided with a pair of rod-like lock engagement portion 112 extending in the horizontal direction, and a coupling spring 111 coupling an end portion of each of the lock engagement portions 112 so as to contact and separate from each other. Each of the lock engagement portions 112 is provided with a spring supporting portion 115 supporting an end portion of the coupling spring 111 in one end portion. Further, each of the lock engagement portions 112 is provided with a lock fitting portion 114 in an end portion in an opposite side to the spring supporting portion 115. The lock engagement portion 112 is provided with a columnar link coupling portion 113 protruding rearward in an end portion having the spring supporting portion 115. The coupling spring 111 can take a normal state in which an external force is not applied, and a contracted state of being contracted by the external force. In the normal state of the coupling spring 111, the whole length of the lock member 110 becomes longer than the distance between the lock fitting holes 53 of the respective rail main bodies 51. On the other hand, in the contracted state of the coupling spring 111, the whole length of the lock member 110 becomes shorter than the distance between the lock fitting holes 53 of the respective rail main bodies 51.

In a state in which the actuation mechanism 60 is assembled, the link coupling portion 113 of each of the lock engagement portions 112 is fitted to each of the lock coupling grooves 103 of the link mechanism 100, and the notches 93 and 95 of the wheel portion 90 are fitted to the lock member 110 so as to be spaced. The link coupling portion 113 moves up and down within the lock coupling groove 103 in accordance with the movement in the vertical direction of the link mechanism 100. An upper end of the lock coupling groove 103 is wider than a lower end. Accordingly, in the case that each of the link coupling portions 113 is positioned at the upper end of each of the lock coupling grooves 103, the coupling spring 111 is maintained in the normal state. Therefore, the end portion of each of the lock fitting portions 114 is fitted to the lock fitting hole 53 so as to be locked. On the other hand, in the case that each of the link coupling portions 113 is positioned at the lower end of each of the lock coupling grooves 103, the coupling spring 111 is contracted from both ends by the lock engagement portion 112. Accordingly, the end portion of each of the lock fitting portions 114 comes off the lock fitting hole 53 of the rail main body 51, and the movable console 18 is unlocked. In the present embodiment, the lock member 110 and the lock fitting hole 53 of the rail main body 51 construct the lock mechanism.

Next, a description will be given of an operation of the center console 12 with reference to FIGS. 3 and 4.

Figure 4A:
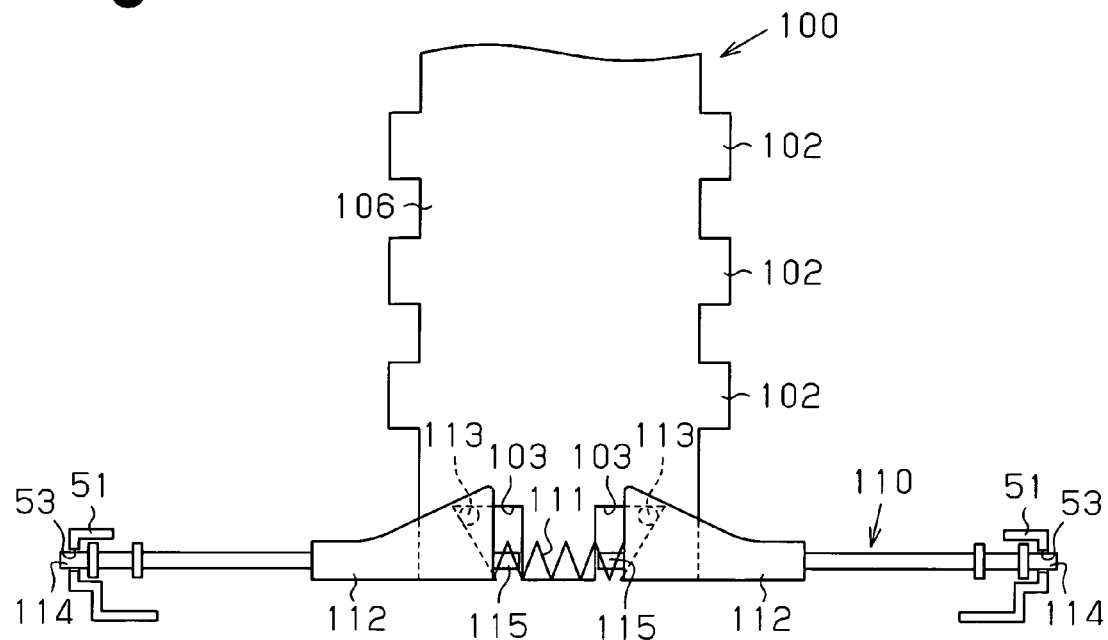
FIG. 4(A) is a front view schematically showing a link mechanism, a lock member and a rail main body of the actuation mechanism of the center console in a locked state.

First, a description will be given of a locked state in which the movable console 18 is locked against movement by the lock mechanism. In the locked state, the lever main body 80 is supported to the main body portion 70 by the pin shaft 83 in an upright state as shown in FIG. 3(A). At this time, the fitting pin 85 is arranged in the top portion of the link guide groove 105, and is arranged in the bottom portion of the main body guide groove 74. Further, the link mechanism 100 comes to a first state in which the lever coupling portion 104 is brought into contact with the lower surface of the opening portion 75 of the lever mounting portion 72. In the first state, as shown in FIG. 4(A), each of the link coupling portions 113 is positioned at an upper end of each of the lock coupling grooves 103. At this time, since the coupling spring 111 is maintained in the normal state, the end portion of each of the lock fitting portions 114 is fitted to the lock fitting hole 53 of the rail main body 51, and the movable console 18 is locked.

Next, a description will be given of a state in which the movable console 18 locked by the lock mechanism is unlocked. A description will be given in detail of the case that the movable console 18 is moved forward. In this unlocked state, the lever main body 80 is operated by an occupant, and is inclined forward as shown in FIG. 3(B). At this time, the fitting pin 85 within the third through hole 87 is moved up diagonally rearward along the circular arc shaped main body guide groove 74. At this time, the guide engagement portion 102 of the link mechanism 100 is sandwiched by the link guide portion 76 of the main body portion 70. Accordingly, since the link mechanism 100 can only move in the vertical direction, the fitting pin 85 pushes up the link mechanism 100 on the rear side than the top portion of the link guide groove 105, in accordance with the rearward movement of the fitting pin 85. In other words, if the fitting pin 85 is moved up rearward on the basis of the tilting motion of the operation lever 81, the link mechanism 100 is moved up from the position in the locked state and the lever coupling portion 104 is brought into contact with the upper surface of the opening portion 75 (a second state).

Figure 4B:
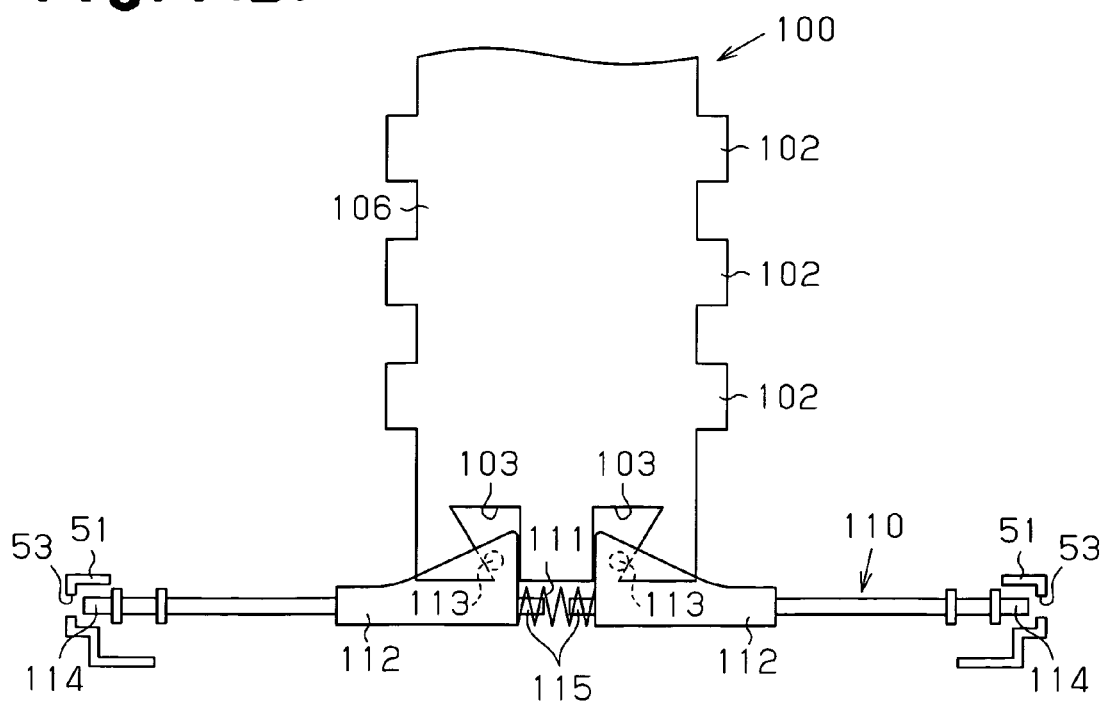
FIG. 4(B) is a front view schematically showing the link mechanism, the lock member and the rail main body of the actuation mechanism of the center console in an unlocked state.

As shown in FIG. 4(B), the link coupling portion 113 is arranged in the lower end of the lock coupling groove 103 in accordance with the upward movement of the link mechanism 100. Accordingly, since the end portions of the respective link coupling portions 113 come close to each other, the coupling spring 111 is contracted. As a result, each of the lock fitting portions 114 comes off the lock fitting hole 53 of the rail main body 51, and the movable console 18 is unlocked. The wheels 92 of the wheel portion 90 roll along the rail main body 51 by tilting the operation lever 81 forward so as to unlock the movable console 18 locked by the lock mechanism and pulling the operation lever 81 forward as it is, as mentioned above, so that the movable console 18 is moved forward.

In the case of moving the movable console 18 rearward, an occupant operates the operation lever 81 so as to tilt it rearward, although not illustrated. Accordingly, the fitting pin 85 is moved upward and the diagonally forward along the circular arc shaped main body guide groove 74. On the basis of the upward movement of the fitting pin 85, the link mechanism 100 is moved up. Therefore, as shown in FIG. 4(B), in the lock member 110, the end portion of each of the lock fitting portions 114 comes off the lock fitting hole 53 of the rail main body 51, and the movable console 18 is unlocked. The movable console 18 is moved rearward by tilting the operation lever 81 rearward so as to unlock the movable console 18 as mentioned above and pulling the operation lever 81 rearward as it is.

The movable console 18 is arranged at a position corresponding to the lock fitting hole 53 of the rail main body 51 after moving to a desired position. After the operation of the operation lever 81 is finished, each of the lock engagement portions 112 is pressed toward the rail main body 51 on the basis of an urging force of the coupling spring 111. Accordingly, as shown in FIG. 4(A), the lock fitting portion 114 of the lock member 110 is fitted to the lock fitting hole 53 so that the movable console 18 is locked. At this time, the link coupling portion 113 is moved within the lock coupling groove 103, and the link mechanism 100 is moved downward together therewith. As mentioned above, if the operation lever 81 is not operated, the link mechanism 100 is moved downward on the basis of the urging force of the coupling spring 111. Further, as shown in FIG. 3(A), the fitting pin 85 is arranged in the top portion of the link guide groove 105, and is arranged in the bottom portion of the main body guide groove 74, and the operation lever 81 again comes to the upstanding state. In other words, at a time when an occupant operates the operation lever 81 to move the movable console 18, the operation lever 81 is always in the upstanding state, and is easily tilted forward and rearward.

In accordance with the present embodiment, the following advantages are obtained.

(1) The operation lever 81 is provided in the upper portion of the movable console 18. The movable console 18 locked by the lock mechanism is unlocked by operating the operation lever 81 in the moving direction of the movable console 18. Accordingly, all the occupants surrounding the movable console 18 can easily operate the operation lever 81. Further, it is possible to move the movable console 18 by operating the operation lever 81 so as to unlock the movable console 18 and thereafter pulling the operation lever 81. In other words, it is possible to smoothly carry out the operation from unlocking the movable console 18 locked by the lock mechanism to moving the movable console 18.

(2) The movable console 18 locked by the lock mechanism is unlocked by operating the operation lever 81 in the moving direction of the movable console 18, that is, forward or rearward. In other words, since the moving direction of the movable console 18 and the operating direction of the operation lever 81 are the same, the convenience is more improved.

(3) The upper portion of the operation lever 81 is exposed in the lever arrangement portion 23 of the movable console 18. Further, the operation lever 81 is tiltably supported to the main body portion 70. Further, the lock mechanism has the link mechanism 100 unlocking the movable console 18 on the basis of the tilting motion of the operation lever 81. As mentioned above, it is possible to unlock the movable console 18 locked by the lock mechanism by the link mechanism 100 only by tilting the operation lever 81 exposed in the movable console 18. Further, since the tilting direction of the operation lever 81 is aligned with the moving direction of the movable console 18, it is possible to smoothly carry out the operation from unlocking the movable console 18 till moving the movable console 18.

(4) In the state in which the movable console 18 is locked by the lock mechanism, the operation lever 81 stands upright on the basis of the urging force of the coupling spring 111. Since the operation lever 81 always stands upright at a time when an occupant operates the operation lever 81, it is possible to easily tilt the operation lever 81 forward and rearward, and the operability is more improved.

Second Embodiment

Next, a description will be given of a second embodiment in accordance with the present invention with reference to FIGS. 5(A) and 5(B).

In the first embodiment, the movable console 18 is locked by the lock mechanism and unlocked by the fitting between the lock fitting portion 114 and the lock fitting hole 53 of the rail main body 51 on the basis of the movement to right and left of the lock member 110. In the second embodiment, as shown in FIGS. 5(A) and 5(B), the movable console 18 is locked by the lock mechanism and unlocked on the basis of movement to up and down of a lock member 170.

As shown in FIGS. 5(A) and 5(B), a lock fitting hole 175 is formed in a horizontal plate 174 coupling a pair of rail main bodies. Further, a link mechanism 160 and a lock member 170 are integrally formed. A lock coupling portion 166 of the link mechanism 160 is constituted by a shorter plate than the lock coupling portion 106 in the first embodiment. The lock member 170 is provided with a lock engagement portion 171 having an L-shaped cross section, and a first spring supporting portion 173 provided in a lower portion of the lock engagement portion 171. The lock engagement portion 171 has a portion protruding forward from a lower end of the lock coupling portion 166 and a portion extending downward. Further, the lock member 170 has a lock fitting portion 176 in a lower end of the lock engagement portion 171. An upper portion of a front surface of the main body portion 70 is provided with a link guide portion 76 to move the link mechanism 160 along a vertical direction. Further, a second spring supporting portion 165 protruding forward is provided in the center of the front surface of the main body portion 70. A lock through hole 163 inserting the lock engagement portion 171 thereto is formed in the second spring supporting portion 165. Further, the first spring supporting portion 173 is provided in the lock engagement portion 171. A spring 162 supported by the second spring supporting portion 165 and the first spring supporting portion 173 is installed to an outer periphery of the lock engagement portion 171. The spring 162 comes to a normal state in the case that the distance between the first and second spring supporting portion 173 and 165 is long, and is compressed by both spring supporting portions 165 and 173 so as to be set to a contracted state in the case that it is short. In the present embodiment, since the horizontal width of the lock member 170 is shorter than the distance between both rail main bodies, notches 93 and 95 are not provided in the wheel portion 90.

As shown in FIG. 5(A), in the state in which the operation lever 81 is not operated, the link mechanism 160 is in the first state positioned, in which it is located in the lower position. In this state, the spring 162 is maintained in the normal state, and the lock fitting portion 176 is fitted to the lock fitting hole 175 so as to lock the movable console 18.

As shown in FIG. 5(B), if the operation lever 81 is tilted forward to move the movable console 18 forward, the link mechanism 160 is moved up so as to come to the second state. At this time, since the lock member 170 is moved up, the lock fitting portion 176 comes off the lock fitting hole 175 and the movable console 18 is unlocked. Since the distance between the first spring supporting portion 173 and the second spring supporting portion 165 is reduced on the basis of the upward movement of the lock member 170, the spring 162 is contracted. It is possible to move the movable console 18 forward by pulling the operation lever 81 forward while keeping the operation lever 81 being inclined as mentioned above. Even if the operation lever 81 is inclined rearward to move the movable console 18 rearward, the link mechanism 160 is moved up and the lock member 170 is moved up, whereby the movable console 18 is unlocked.

If the operation of the operation lever 81 is finished, the first spring supporting portion 173 of the lock member 170 is pressed downward on the basis of the urging force of the spring 162. Accordingly, the lock member 170 is moved down, and the lock fitting portion 176 is again fitted to the lock fitting hole 175 so to lock the movable console 18. Further, the link mechanism 160 is moved down together with the lock member 170 so as to come to the first state, and the operation lever 81 comes to the upstanding state.

Even in the sliding console in which the lock member 170 is moved up and down as mentioned above, since the movable console 18 locked by the lock mechanism is unlocked by inclining the operation lever 81 in the moving direction of the movable console 18, the same advantages as the first embodiment are obtained.

In accordance with the present embodiment, the following advantage (5) is obtained in addition to the advantages of the first embodiment.

(5) The movable console 18 is locked by the lock mechanism and is unlocked, by moving the lock member 170 up and down on the basis of the upward and downward movement of the link mechanism 160. Since the moving direction of the link mechanism 160 and the moving direction of the lock member 170 are the same as mentioned above, it is possible to achieve the locking of the movable console 18 by the lock mechanism and the unlocking of the movable console 18 on the basis of a simple structure.

Third Embodiment

Next, a description will be given of a third embodiment in accordance with the present invention with reference to FIGS. 6(A) and 6(B).

In the first embodiment, the link mechanism 100 is constructed by the lock coupling portion 106, the inclined portion 107 and the lever coupling portion 104, however, in the present embodiment, as shown in FIGS. 6(A) and 6(B), a link mechanism 200 is constructed by a wire 201 and a lock coupling portion 202.

As shown in FIGS. 6(A) and 6(B), the main body portion 70 has an insertion portion 204 inserting the wire 201 thereto on a lower surface of the opening portion 75. An upper end of the wire 201 is wound around the fitting pin 85. Further, the wire 201 is inserted to the insertion portion 204, and is connected to the lock coupling portion 202 in a lower end of the wire 201. The length of the wire 201 from the insertion portion 204 to the fitting pin 85 becomes shortest at a time when the fitting pin 85 is positioned at the bottom portion of the main body guide groove 74. The lock coupling portion 202 is provided with a lock coupling groove 203 having the same shape as the lock coupling groove 103 of the first embodiment, although an illustration will be omitted. The front surface of the main body portion 70 is provided with a wire guide portion 206 in place of the link guide portion 76 in accordance with the first embodiment. The wire guide portion 206 holds the wire 201 so as to be movable up and down along the front surface of the main body portion 70, and limits the movement in the horizontal direction of the wire 201. The other structures are the same as the first embodiment.

As shown in FIG. 6(A), in the state in which the operation lever 81 is not operated, the lock coupling portion 202 is positioned at the lower position. In this case, the link coupling portion 113 of the lock member 110 is positioned at an upper end of the lock coupling groove 203 on the basis of the same operation as the first embodiment. Accordingly, the coupling spring 111 comes to the normal state, and the lock member 110 is locked by fitting the lock fitting portion 114 to the lock fitting hole 53 of the rail main body. As shown in FIG. 6(B), if the operation lever 81 is inclined forward to move the movable console 18 forward, the wire 201 is pulled diagonally rearward, and the lock coupling portion 202 is moved up. Accordingly, since the link coupling portion 113 is arranged at a lower end of the lock coupling groove 203, the coupling spring 111 is contracted. Further, in the lock member 110, the lock fitting portion 114 comes off the lock fitting hole 53 of the rail main body, and the movable console 18 is unlocked. Even in the case of inclining the operation lever 81 rearward to move the movable console 18 rearward, since the wire 201 is pulled diagonally forward, the lock coupling portion 202 is moved up and the movable console 18 is unlocked. In the present embodiment, the movable console 18 can be unlocked by the operation lever by employing the wire 201 in a part of the link mechanism 200, and the same advantage as the first embodiment is obtained.

Fourth Embodiment

Next, a description will be given of a fourth embodiment in accordance with the present invention with reference to FIGS. 7(A) and 7(B).

In each of the embodiments mentioned above, the movable console 18 is unlocked by inclining the operation lever 81 forward or rearward, however, in the fourth embodiment, the movable console 18 is unlocked by pulling an operation lever 251 forward or rearward. Further, structures of a lever mounting portion 272 of a main body portion 270 and a lever main body 250 are different from each of the embodiments mentioned above.

Figure 7A:
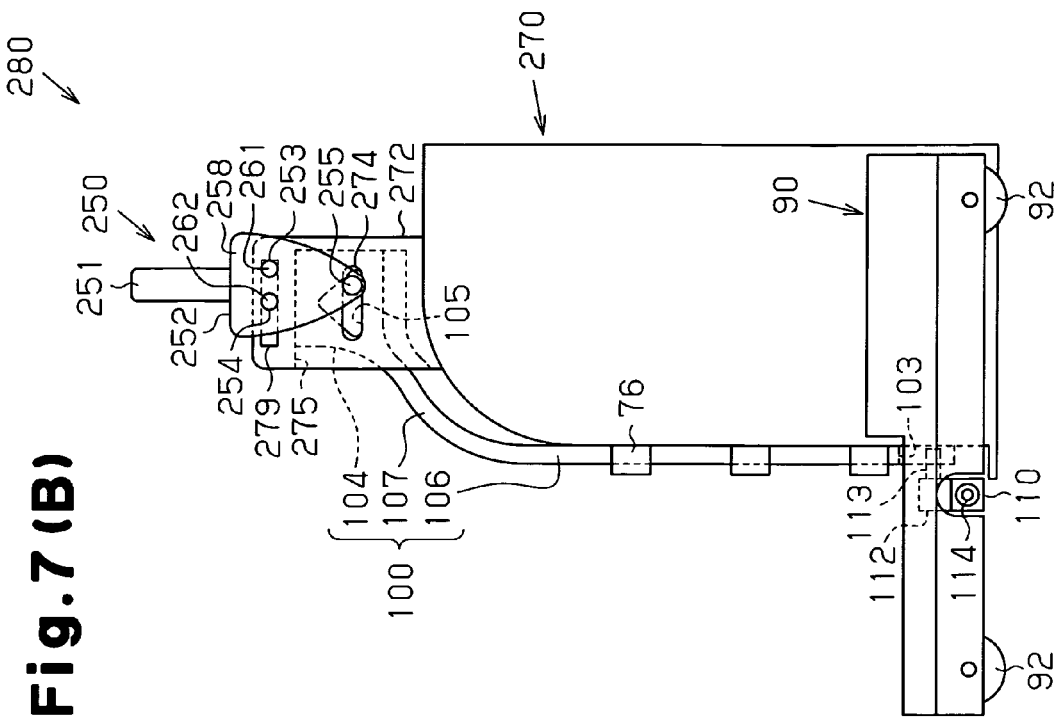
FIG. 7(A) is a side view schematically showing an actuation mechanism of a center console in accordance with a fourth embodiment in a locked state.
Figure 7B:
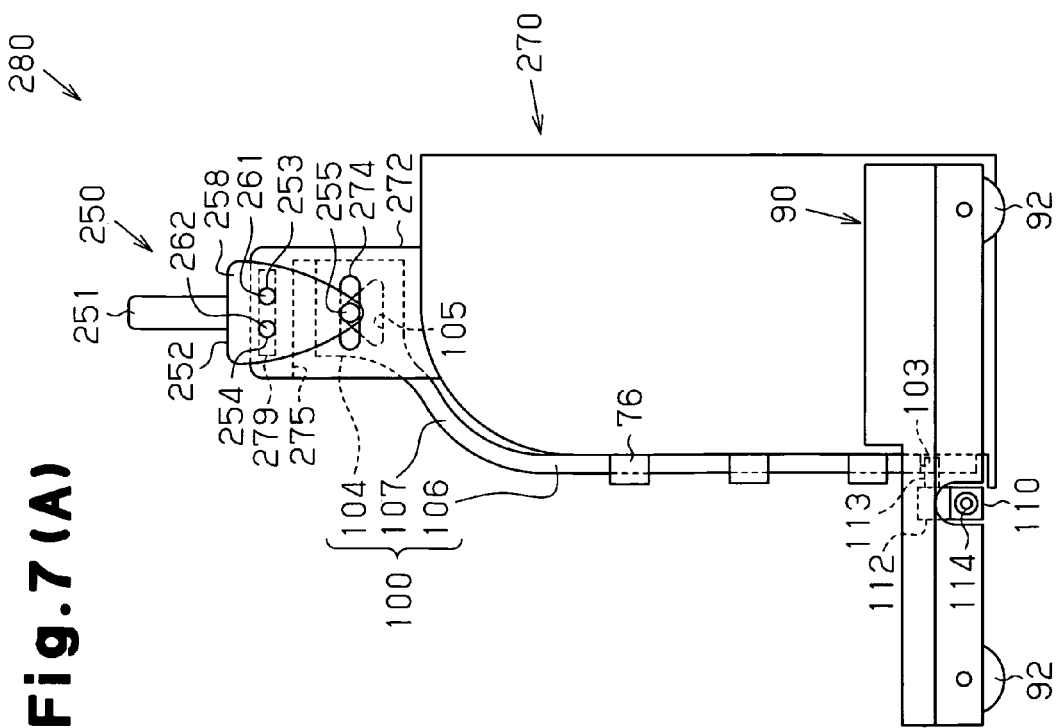
FIG. 7(B) is a side view schematically showing the actuation mechanism of the center console in accordance with the fourth embodiment in an unlocked state.

As shown in FIGS. 7(A) and 7(B), in each of the embodiments mentioned above, a slide groove 279 extending along the vehicle longitudinal direction is formed in both side surfaces of the lever mounting portion 272 in place of the pin supporting portion provided in the upper portion of the lever mounting portion 272. Further, an upper surface of the slide groove 279 is flat. The main body guide groove 274 is not formed as a circular arc shape, but is formed substantially as a rectangular shape extending along the vehicle longitudinal direction.

The lever main body 250 is provided with a rod-like operation lever 251, and a main body coupling portion 252 provided in a lower portion of the operation lever. The operation lever 251 is exposed in the lever arrangement portion 23. The main body coupling portion 252 has a front through hole 254 and a rear through hole 253 in the center of an upper portion of the side wall plate 258. A front supporting pin 262 and a rear supporting pin 261 are respectively inserted from the front through hole 254 and the rear through hole 253 on a left side (on a front side in FIG. 7) of the vehicle, and are inserted to the front through hole 254 and the rear through hole 253 in a right side of the vehicle while passing through the slide groove 279 of the lever mounting portion 272. A locking portion (not shown) is fixed to an end portion of each of the supporting pins 262 and 261 for preventing each of the supporting pins 262 and 261 from coming off the front and rear through holes 254 and 253. Each of the supporting pins 262 and 261 slides within the slide groove 279 by operating the operation lever 251 so as to pull forward or rearward. The lever main body 250 is slidable until each of the supporting pins 262 and 261 reaches the front end or the rear end of the slide groove 279.

As shown in FIG. 7(A), the operation lever 251 is positioned substantially in the center of the lever mounting portion 272 in a state in which the operation lever 251 is not operated. In this state, the fitting pin 255 is positioned at the top portion of the link guide groove 105. In other words, the lever coupling portion 104 of the link mechanism 100 is in the first state coming into contact with the lower surface of the opening portion 275, and the movable console 18 is locked by the lock mechanism.

As shown in FIG. 7(B), if the operation lever 251 is pulled rearward to move the movable console 18 rearward, the main body coupling portion 252 is also moved rearward while sliding the supporting pins 262 and 261 within the slide groove 279. The operation lever 251 is pulled until the rear supporting pin 261 reaches the rear end portion of the slide groove 279. At this time, the fitting pin 255 is moved rearward from the top portion of the link guide groove 105. In other words, if the operation lever 81 is pulled rearward, the fitting pin 255 is moved rearward within the link guide groove 105, and the rear portion of the link guide groove 105 is moved up to the same height as the top portion of the link guide groove 105 at a time of the locked state. As a result, the link mechanism 100 is moved above the original position, and comes to the second state. Accordingly, in the same manner as the first embodiment, since the end portions of the respective lock engagement portions 112 are pulled toward each other in the lock member 110, the lock fitting portion 114 is comes off the lock fitting hole 53 of the rail main body 51, and the movable console 18 is unlocked. In the case of pulling the operation lever 251 forward to move the movable console 18 forward, the fitting pin 255 is moved forward, and the link mechanism 100 is moved upward, whereby the movable console 18 is unlocked.

In accordance with the present embodiment, it is possible to unlock and move the movable console 18 by pulling the operation lever 251 along the intended moving direction of the movable console 18, and it is possible to obtain the same advantages as the advantages (1) and (2) of the first embodiment.

Fifth Embodiment

Next, a description will be given of a fifth embodiment in accordance with the present invention with reference to FIGS. 8 to 11.

In the first embodiment, if the operation lever 81 is inclined forward or rearward from the upstanding state, the link mechanism 100 is moved up and the movable console 18 locked by the lock mechanism is unlocked. In contrast, in accordance with the fifth embodiment, if the operation lever 81 is inclined forward or rearward from the upstanding state, a link mechanism 310 is moved down and the movable console 18 locked by the lock mechanism is unlocked. Further, the fifth embodiment is different from the first embodiment in that a main body portion 301 is mounted on a carriage 330 to which wheels 331 are attached, and structures of a link mechanism 310 and a lock member 370.

The carriage 330 is formed in a U-shaped cross sectional form, and is arranged so as to direct an opening downward. The carriage 330 is provided with a top plate 333 to which the main body portion 301 is mounted, and a pair of wheel attaching portions 334 in both side portions of the top plate 333. The horizontal width of the top plate 333 is substantially the same as the horizontal width of the main body portion 301, and the length in the vehicle longitudinal direction of the top plate 333 is longer than the main body portion 301. The main body portion 301 is mounted to a rear portion of the top plate 333, and a lock member 370 is mounted to a front side of the main body portion 301. The wheels 331 are attached to a front end and a rear end of each of the wheel attaching portions 334 by an axle 335 so as to freely roll.

The main body portion 301 is formed substantially as the same shape as the main body portion 70 in accordance with the first embodiment. A lever mounting portion 302 is provided in the center of an upper surface of the main body portion 301. Further, a pair of link guide portions 306 are provided in the center of the front surface of the main body portion 301, at each of three positions comprising an upper portion, a center portion and a lower portion. The lever mounting portion 302 and the link guide portion 306 are respectively the same as the lever mounting portion 72 and the link guide portion 76 in accordance with the first embodiment. The main body portion 301 is mounted to a rear portion of the carriage 330 as mentioned above. The same lever main body 80 as that of the first embodiment is mounted to the lever mounting portion 302 of the main body portion 301.

The present embodiment is different from the first embodiment in a link guide groove 315 formed in the lever coupling portion 314, and a lock coupling groove 313 formed in a lock coupling portion 316. The link guide groove 315 is formed substantially as an inverted triangular shape. Two lines extending diagonally upward from a bottom portion of the link guide groove 315 are inclined at a steeper angle than a circular arc extending from a bottom portion of the main body guide groove 304 provided in the lever mounting portion 302 upward. The lock coupling groove 313 is formed as a right angled triangular shape. The lock coupling groove 313 has a line extending vertically to a center of the lock coupling portion 316, and a diagonal line coming close to a side edge of the lock coupling portion 316 as the distance from the lower side decreases. In the same manner as the first embodiment, the lever coupling portion 314 is accommodated in the opening portion 305 of the lever mounting portion 302. The guide engagement portion 312 is sandwiched by the link guide portion 306 of the main body portion 301.

A lock cover 380 having a U-shaped cross section is arranged in a front portion of an upper surface of the top plate 333. A lock member 370 is arranged in a space between the lock cover 380 and the main body portion 301. The lock member 110 in accordance with the first embodiment has the rod-like lock engagement portion 112, however, the lock member 370 in accordance with the present embodiment has a pair of lock engagement portions 372 formed by bending a substantially plate-like member. In accordance with this structure, it is possible to make the rigidity of the actuation mechanism 300 higher than the structure constructed by the rod material. An end portion opposing to each other of a pair of lock engagement portions 372 is provided with a spring supporting portion 375 for installing a coupling spring 371. The coupling spring 371 couples a pair of lock engagement portions 372 so as to contact and separate from each other. The lock engagement portion 372 has a plate-like lock fitting portion 374 which is bent up and down in an end portion in an opposite side to the spring supporting portion 375. In a state in which the lock member 370 is accommodated within the lock cover 380, an end portion in a side of the lock fitting portion 374 is exposed from openings in both ends of the lock cover 380. The lock engagement portion 372 is provided with a columnar link coupling portion 373 protruding rearward, in an end portion having the spring supporting portion 375. In a state in which the lock member 370 is accommodated within the lock cover 380, the link coupling portion 373 is fitted to the lock coupling groove 313 of the link mechanism 310 in a state of being exposed from the opening on the rear side of the lock cover 380.

A lock fitting groove 357 fitting to the lock fitting portion 374 is formed in the rail main body 351, in place of the lock fitting hole 53 in accordance with the first embodiment. In a normal state in which an external force is not applied to the coupling spring 371, the lock fitting portion 374 is fitted to the lock fitting groove 357. On the other hand, in a state in which the external force is applied to the coupling spring 371 and the coupling spring 371 is contracted, the lock fitting portion 374 is disengaged from the lock fitting groove 357.

Figure 10A:
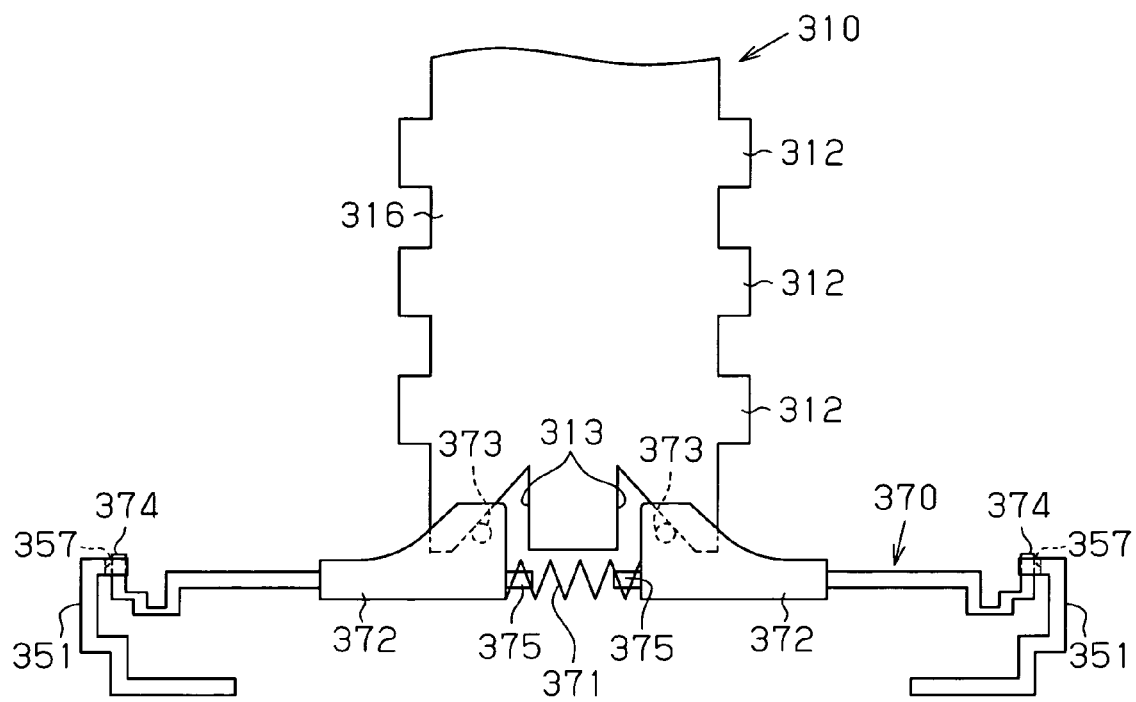
FIG. 10(A) is a front view schematically showing a link mechanism, a lock member and a rail main body of the actuation mechanism of the center console in a locked state.

Next, a description will be given of an operation of the center console 12 mentioned above with reference to FIGS. 9(A) to 10(B). First, a description will be given of a locked state in which the movable console 18 is locked against movement by the lock mechanism. In the locked state, the lever main body 80 is supported to the main body portion 301 by the pin shaft 83 in an upstanding state as shown in FIG. 9(A). At this time, the fitting pin 85 is arranged in the bottom portion of the link guide groove 315, and is arranged in the bottom portion of the main body guide groove 304. Further, the link mechanism 310 comes to a first state in which the lever coupling portion 314 is brought into contact with the upper surface of the opening portion 305 of the lever mounting portion 302. In the first state, as shown in FIG. 10(A), the link coupling portion 373 is positioned close to the lower end of the lock coupling groove 313. At this time, the coupling spring 371 is maintained in the normal state, the end portion of each of the lock fitting portions 374 is fitted to the lock fitting groove 357 of the rail main body 351, and the movable console 18 is locked.

Next, a description will be given of the state in which the movable console 18 locked by the lock mechanism is unlocked. A description will be given in detail of the case that the movable console 18 is moved forward. In this unlocked state, the lever main body 80 is operated by an occupant and is inclined forward as shown in FIG. 9(B). At this time, the fitting pin 85 within the third through hole 87 is moved up diagonally rearward along the circular arc shaped main body guide groove 304. At this time, since the guide engagement portion 312 is sandwiched by the link guide portion 306, the link mechanism 310 can be moved only in the vertical direction. Accordingly, in accordance with the rearward movement of the fitting pin 85, the fitting pin 85 pushes down the link mechanism 310 on the rear side than the bottom portion of the link guide groove 315. In other words, the fitting pin 85 is moved up diagonally rearward by inclining the operation lever 81 forward. However, since the inclination of the line of the link guide groove 315 is larger than the locus of the circular arc generated by the fitting pin 85, the link mechanism 310 is pushed down in the rear portion of the link guide groove 315. As a result, there is generated a second state in which the lever coupling portion 314 is brought into contact with the lower surface of the opening portion 305.

Figure 10B:
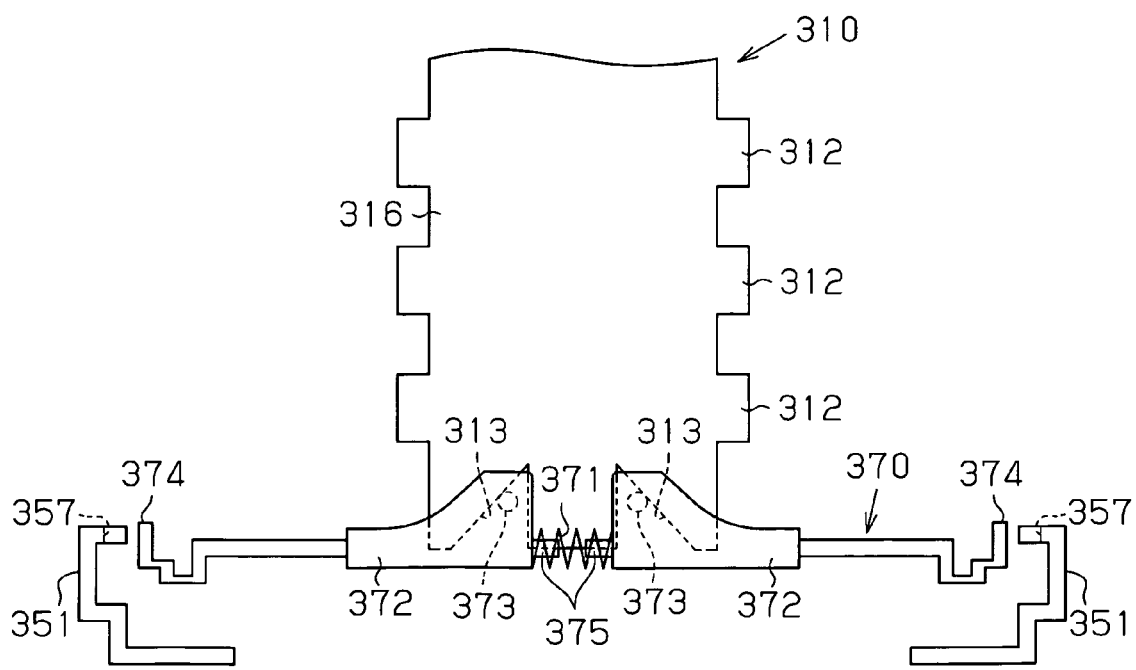
FIG. 10(B) is a front view schematically showing the link mechanism, the lock member and the rail main body of the actuation mechanism of the center console in an unlocked state.

As shown in FIG. 10(B), in accordance with the downward movement of the link mechanism 310, the link coupling portion 373 of the lock member 370 is arranged at the upper end of the lock coupling groove 313 of the link mechanism 310. Accordingly, since the end portions of the link coupling portions 373 come close to each other, the coupling spring 371 is contracted. As a result, the end portion of each of the lock fitting portions 374 is disengaged from the lock fitting groove 357 of the rail main body 351, and the movable console 18 is unlocked.

The wheels 331 roll along the rail main body 351 by inclining the operation lever 81 forward so as to unlock the movable console 18 locked by the lock mechanism and pulling the operation lever 81 as it is, and the movable console 18 is moved forward. Even in the case that the operation lever 81 is inclined rearward to move the movable console 18 rearward, the link mechanism 310 is moved down so as to come to the second state, the coupling spring 371 is contracted, and the movable console 18 is unlocked.

After the operation of the operation lever 81 is finished, each of the lock engagement portions 372 is pressed toward the rail main body 351 on the basis of the urging force of the coupling spring 371 in the lock member 370. Accordingly, as shown in FIG. 10(A), the lock fitting portion 374 is fitted to the lock fitting groove 357, and the movable console 18 is locked again by the lock mechanism. At this time, the link coupling portion 373 is arranged near the lower end of the lock coupling groove 313. As a result, the link mechanism 310 is moved up so as to come to the first state, and the operation lever 81 comes to the upstanding state.

In the present embodiment, at a time of assembling the guide rail 350 and the actuation mechanism 300 in the vehicle, the guide rail 350 and a member of the actuation mechanism 300 are first assembled as shown in FIG. 11. Further, although not illustrated in FIG. 11, the upper member of the actuation mechanism 300 such as the main body portion 301, the link mechanism 310, the lever main body 80 and the like are previously assembled. After assembling the guide rail 350 and the lower member of the actuation mechanism 300 in the vehicle, the upper member of the actuation mechanism 300 is mounted and fixed onto the lower member of the actuation mechanism 300. Accordingly, at a time of assembling in the vehicle, it is sufficient to carry out these two steps within the passenger compartment. In this case, the lock coupling groove 313 is formed as a right angled triangular shape having a diagonal line which comes close to the side edge of the lock coupling portion 316 as the distance from the lower side decreases. Accordingly, at a time of assembling the upper member on the lower member of the actuation mechanism 300, it is possible to fit the link coupling portion 373 of the lock member 370 to the lock coupling groove 313 even if the coupling spring 371 is in the normal state. At a time of assembling the upper member on the lower member of the actuation mechanism 300 by using the link mechanism 100 in accordance with the first embodiment, it is necessary to temporarily contract the coupling spring 111 for fitting the link coupling portion 113 of the lock member 110 to the lock coupling groove 103. In this regard, in accordance with the present embodiment, it is possible to fit the link coupling portion 373 to the lock coupling groove 313 without contracting the coupling spring 371, and it is possible to easily carry out the assembling work within the passenger compartment. The other structures which are not referred particularly are the same as the first embodiment.

In accordance with the present embodiment, it is possible to obtain the same advantages as the advantages (1) to (4) described in the first embodiment and the following advantage (6) mentioned below.

(6) In the present embodiment, the guide rail 350 and the lower member of the actuation mechanism 300 are assembled in advance, and the upper member of the actuation mechanism 300 is assembled. Further, these two parts are taken into the passenger compartment and can be assembled in the vehicle. Accordingly, it is possible to reduce the weight the parts at a time of being taken into the vehicle in comparison with the method of assembling all the parts and thereafter assembling in the vehicle. Further, the assembling work within the vehicle is simplified in comparison with the method of assembling the parts in the vehicle in the state of dissembling all the parts. Further, at a time of assembling the parts, the upper member can be mounted and assembled in the lower member of the actuation mechanism 300 while keeping the coupling spring 371 of the lock member 370 in the normal state.

Sixth Embodiment

Next, a description will be given of a sixth embodiment in accordance with the present invention with reference to FIGS. 12 to 15.

The sixth embodiment is the same as the fifth embodiment in a point that the movable console 18 locked by the lock mechanism is unlocked by inclining the operation lever 81 forward or rearward from the upstanding state so as to move down a link mechanism 410. However, the sixth embodiment is different from the fifth embodiment in a point that the link mechanism 410 is divided into an upper portion and a lower portion, that is, a first link mechanism 420 and a second link mechanism 430.

As shown in FIGS. 12 and 13, a partition plate 448 having an L-shaped cross sectional form is provided in a top plate 443 of a carriage 440 for defining a rear portion and a front portion. A pair of elongated slide grooves 449 open upward are formed in the partition plate 448. A slide rod of the second link mechanism 430 is slidably fitted into the slide groove 449. The other structures in the carriage 440 are the same as the carriage 330 in accordance with the fifth embodiment. A main body portion 401 is mounted to a rear portion of the top plate 443. A pair of link guide portions 406 are provided only in an upper portion in a center of a front surface of the main body portion 401. The sixth embodiment is different from the fifth embodiment in this point, however, is the same as the fifth embodiment in the other structures.

A lock cover 480 is arranged in a front portion of the top plate 443. A center of a front surface of the lock cover 480 extends upward, and a center of an upper surface of the lock cover 480 is open. A pair of elongated slide grooves 489 open upward are provided in the center of the front surface of the lock cover 480. A slide rod 434 of the second link mechanism 430 is slidably fitted to the slide groove 489. A lock member 470 is arranged in a space between the lock cover 480 and the partition plate 448. Each of the lock engagement portions 472 is provided with a pair of columnar link coupling portions 473 protruding forward and rearward in an end portion having a spring support portion 475. The sixth embodiment is different from the fifth embodiment in this point, however, is the same as the fifth embodiment in the other structures.

The first link mechanism 420 is provided with a lever coupling portion 424, a plate-like guide portion 426 extending in a vertical direction, and a pressing portion 427 having a right angled triangular shape. A link guide groove 425 having a substantially inverted triangular shape is formed in the same manner as the fifth embodiment in the lever coupling portion 424. A pair of guide engagement portions 422 engaging with both link guide portions 406 are formed in the guide portion 426. A lower surface of the pressing portion 427 is brought into contact with an upper surface of the second link mechanism 430.

The second link mechanism 430 is provided with a press portion 431, an intermediate portion 432 and a lock coupling portion 433. In a state in which the actuation mechanism 400 is assembled, a lower surface of the pressing portion 427 of the first link mechanism 420 is brought into contact with an upper surface of the press portion 431. A front surface of the intermediate portion 432 is provided with a pair of columnar slide rods 434 protruding forward. Each of the slide rods 434 is fitted to a slide groove 489 of a lock cover 480 so as to slide up and down within each of the slide grooves 489. Further, although not illustrated in FIG. 12, a rear surface of the intermediate portion 432 is provided with a pair of columnar slide rods protruding rearward. Each of the slide rods is fitted to the slide groove 449 of the partition plate 448 so as to slide up and down within each of the slide grooves 449. The lock coupling portion 433 is provided with a front plate 436 and a rear plate 437. Trapezoidal lock coupling grooves 438 and 439 are formed in the front plate 436 and the rear plate 437. In a state in which the actuation mechanism 400 is assembled, a part of the upper surface of the lock engagement portion 472 is exposed from the opening of the lock cover 480, and the exposed portion is further covered by the lock coupling portion 433. The link coupling portions 473 of the lock member 470 are respectively engaged with the lock coupling grooves 438 and 439 of the front plate 436 and the rear plate 437.

Figure 14A:
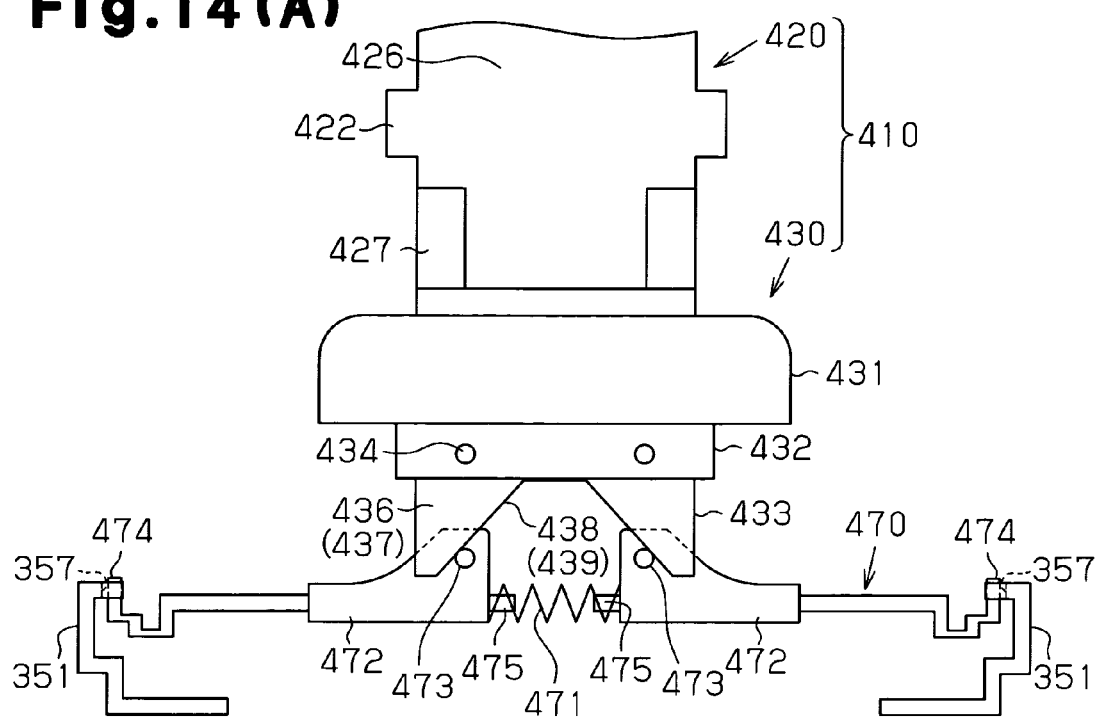
FIG. 14(A) is a front view schematically showing a link mechanism, a lock member and a rail main body of the actuation mechanism of the center console in a locked state.

Next, a description will be described of an operation of the center console 12 in accordance with the present embodiment with reference to FIGS. 13(A) to 14(B). A description will be first given of a locked state in which the movable console 18 is locked against movement by the lock mechanism. In the locked state, the lever main body 80 is supported to the main body portion 401 by the pin shaft 83 in an upstanding state as shown in FIG. 13 (A). At this time, the fitting pin 85 is arranged in the bottom portion of the link guide groove 425, and is arranged in the bottom portion of the main body guide groove 404. At this time, the first link mechanism 420 comes to a first state in which the lever coupling portion 424 is brought into contact with the upper surface of the opening portion 405 of the lever mounting portion 402. In the first state, as shown in FIG. 14(A), the link coupling portion 473 is positioned near the lower end of each of the lock coupling grooves 438 and 439 in the front plate 436 and the rear plate 437. In this case, since the coupling spring 471 is maintained in the normal state, each of the lock fitting portion 474 of the lock member 470 is fitted to each of the lock fitting grooves 357 of the rail main body 351 so as to lock the movable console 18.

Next, a description will be given of a state in which the movable console 18 locked by the lock mechanism is unlocked. A description will be given in detail of a case that the movable console 18 is moved forward.

Figure 14B:
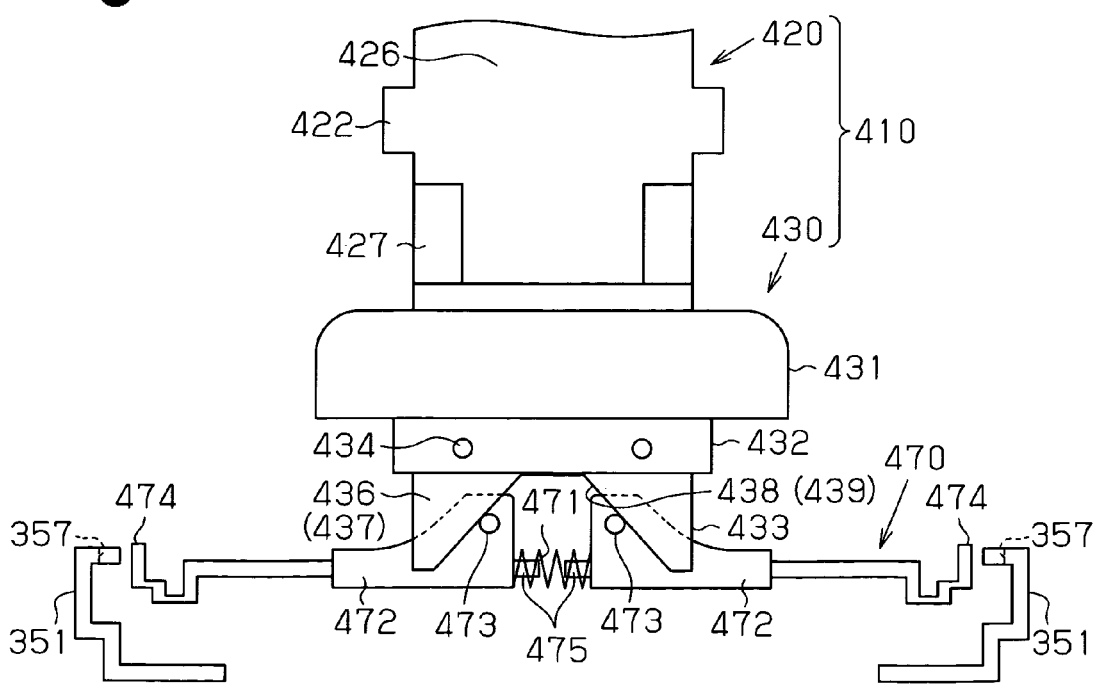
FIG. 14(B) is a front view schematically showing the link mechanism, the lock member and the rail main body of the actuation mechanism of the center console in an unlocked state.

In this unlocked state, the lever main body 80 is operated by an occupant so as to be inclined forward as shown in FIG. 13(B). At this time, the fitting pin 85 within the third through hole 87 is moved up diagonally rearward along the circular arc shaped main body guide groove 404. At this time, in the same manner as the fifth embodiment, the fitting pin 85 pushes down the first link mechanism 420 in the link guide groove 425. Accordingly, the first link mechanism 420 moves down, and comes to a second state in which the lever coupling portion 424 is brought into contact with the lower surface of the opening portion 405. In accordance with the downward movement of the first link mechanism 420, the pressing portion 427 of the first link mechanism 420 presses the press portion 431 of the second link mechanism 430, and the second link mechanism 430 is moved down on the basis of the pressing. In accordance with the downward movement of the second link mechanism 430, the link coupling portion 473 is arranged near the upper end within each of the lock coupling grooves 438 and 439 of the lock coupling portion 433, as shown in FIG. 14(B). In the lock member 470, since the opposing end portions of each of the link coupling portions 473 come close to each other and the coupling spring 471 is contracted, each of the lock fitting portions 474 of the lock member 470 is disengaged from the lock fitting groove 357 of the rail main body 351, and the movable console 18 is unlocked.

As mentioned above, it is possible to unlock the movable console 18 locked by the lock mechanism by inclining the operation lever 81 forward and move the movable console 18 forward by pulling the operation lever 81 as it is. In the case that the operation lever 81 is inclined rearward to move the movable console 18 rearward, the first link mechanism 420 is moved down, and the second link mechanism 430 is moved down in accordance therewith. Accordingly, the coupling spring 471 of the lock member 470 is contracted, and the movable console 18 is unlocked.

After the operation of the operation lever 81 is finished, each of the lock engagement portion 472 is pressed toward the rail main body 351 on the basis of the urging force of the coupling spring 471, in the lock member 470. Accordingly, as shown in FIG. 14(A), the lock fitting portion 474 of the lock member 470 is fitted to the lock fitting groove 357 of the rail main body 351, and the movable console 18 is again locked. At this time, the link coupling portion 473 is arranged near the lower end of each of the lock coupling grooves 438 and 439. Accordingly, the second link mechanism 430 is moved up together with the first link mechanism 420 so as to come to the first state, and the operation lever 81 comes to the upstanding state.

Figure 15:
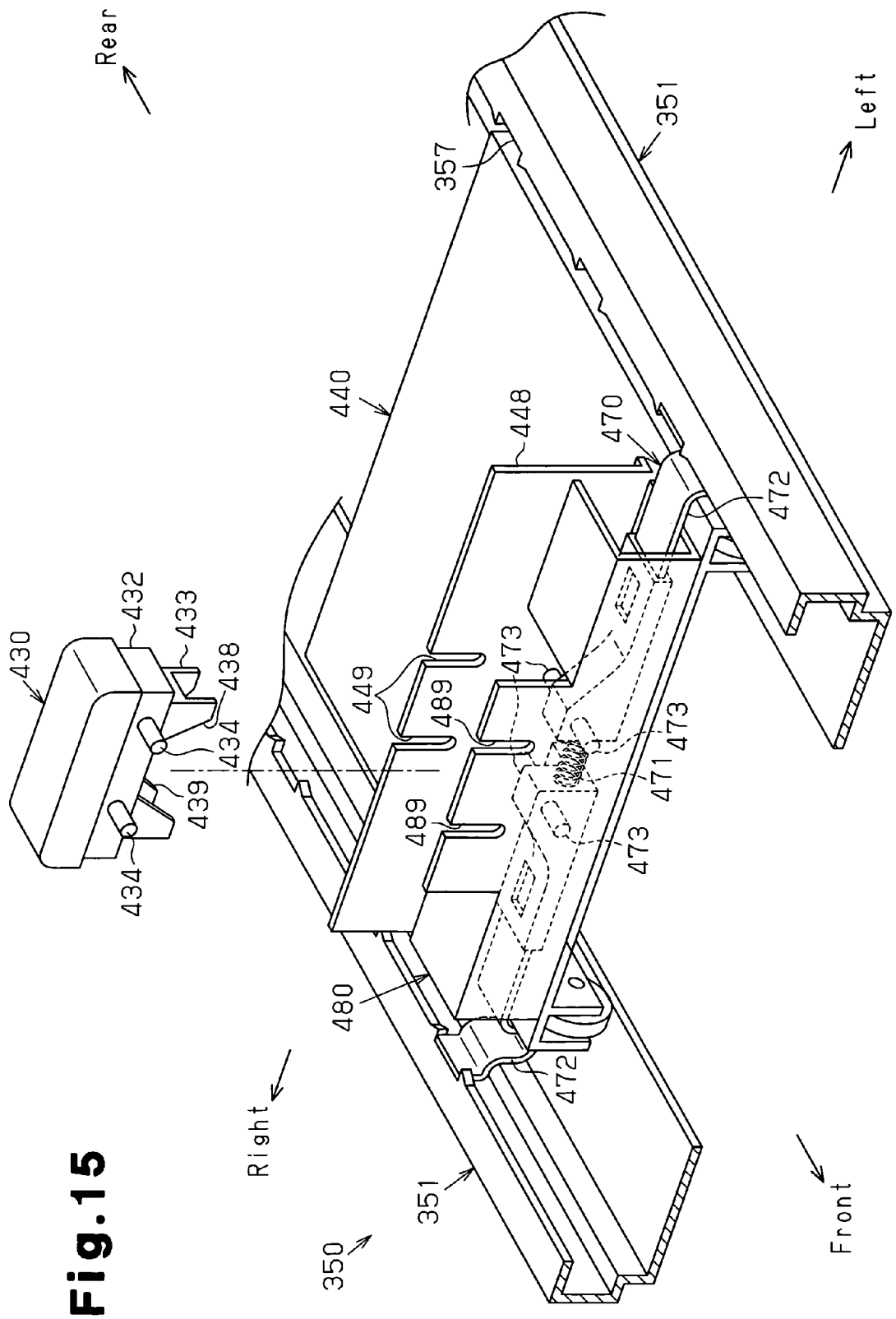
FIG. 15 is a perspective view showing an assembling state of a guide rail of the center console, a carriage of the actuation mechanism, a lock cover and the lock member and a second link mechanism.

In the present embodiment, as shown in FIG. 15, after assembling the guide rail 350, the carriage 440 of the actuation mechanism 400, the lock cover 480 and the lock member 470, the second link mechanism 430 and these members are assembled further. In accordance with this assembly, the slide rod 434 on the front side of the second link mechanism 430 is fitted to the slide groove 489 of the lock cover 480, and the slide rod 434 on the rear side is fitted to the slide groove 449 of the partition plate 448. Further, in the lock member 470, the portion near the coupling spring 471 of the lock engagement portion 472 is covered by the lock coupling portion 433, and the link coupling portion 473 is engaged with the lock coupling grooves 438 and 439. The upper members of the actuation mechanism 400 in which the main body portion 401 (not shown in FIG. 15), the first link mechanism 420, the lever main body 80 and the like are assembled are mounted and fixed onto the members assembled as mentioned above. Accordingly, at a time of assembling within the vehicle, it is sufficient to take two previously assembled parts within the vehicle and mount and fix the upper member of the actuation mechanism 400 onto the lower member of the actuation mechanism 400. At this time, it is not necessary to position each of the lock coupling grooves 438 and 439 of the second link mechanism 430 and the link coupling portion 373 of the lock member 370. Accordingly, it is possible to very easily carry out the assembling work within the vehicle. The other structures which are not particularly referred are the same as the first embodiment.

In accordance with the present embodiment, it is possible to obtain the following advantage (7), in addition to the same advantages as the advantages (1) to (4) described in the first embodiment and the advantage (6) described in the fifth embodiment.

(7) In the present embodiment, the lower members of the actuation mechanism 400 such as the guide rail 350, the carriage 440 of the actuation mechanism 400, the lock cover 480, the lock member 470, the second link mechanism 430 and the like are assembled in advance. Also, the upper members of the actuation mechanism 400 such as the main body portion 401 of the actuation mechanism 400, the first link mechanism 420 and the lever main body 80 and the like are assembled in advance. These two parts can be taken in the vehicle, and can be assembled in the vehicle. Accordingly, at a time of assembling within the vehicle, it is sufficient to mount and fix the upper member of the actuation mechanism 400 onto the lower members of the actuation mechanism 400, and it is possible to very easily assemble.

The present invention may be embodied into other embodiments shown below.

In each of the first to fourth embodiments, the wheel portion 90 provided with the wheels 92 are attached to both of the side surfaces of the main body portion 70. However, the main body portion may be mounted on the carriage as in each of the fifth and sixth embodiments. At a time of attaching the actuation mechanism and the guide rail within the vehicle, the structure may be made such as to divide these into two parts as in the fifth and sixth embodiments, so that the two parts are taken into a vehicle. In this case the guide rail and the lower member of the actuation mechanism are assembled, and thereafter the upper member of the actuation mechanism is mounted and fixed onto the lower member. Further, the lock engagement portion 112 in each of the first, third and fourth embodiments may be formed as a plate shape, and the lock members 370 and 470 in each of the fifth and sixth embodiments may be formed as a rod shape. Further, in each of the embodiments, the other structures than the lock engagement portion may appropriately employ the structure employed in other embodiments.

In each of the embodiments, the moving mechanism is constructed by the guide rail, and the actuation mechanism having the wheels, however, the moving mechanism may be constructed by an actuation mechanism having no wheel, and a supporting member slidably supporting both side portions of the actuation mechanism. Further, the moving mechanism may be structured such that a plurality of rollers are arranged in both side portions of the recess 30, the actuation mechanism having no wheel is arranged on each of the rollers, and the actuation mechanism is moved in the vehicle longitudinal direction on the basis of a rotation of the rollers.

In each of the embodiments, the center console 12 is provided with the fixed console 13 and the movable console 18, however, the fixed console may be omitted. Further, a cup holder may be formed in the fixed console, and a storage compartment may be formed in the movable console.

In each of the embodiments, the structure is made such that the movable console locked by the lock mechanism is unlocked regardless of whichever the operation lever is operated forward or rearward. However, the structure may be made such that the movable console is unlocked on the basis of the operation in at least one direction of the moving directions of the movable console. Even in this case, since the movable console can be unlocked by operating the operation lever in one direction, and the movable console can be moved as it is, it is possible to smoothly carry out the operation after unlocking the movable console and till moving the movable console.

The sliding console in accordance with each of the embodiments is provided with the movable console which is movable in the vehicle longitudinal direction. However, the sliding console may be provided with a movable console which is movable in the vehicle width direction.

In each of the embodiments, the positions, the number and the like of the lock fitting portions of the lock member, and the lock fitting holes of the rail main body are not particularly limited. For example, in the case of locking and unlocking the movable console on the basis of the vertical movement of the lock member 170 as in the second embodiment, the lock fitting hole may be provided on the lower surface of the wheel engagement portion in each of the rail main bodies, in place of the horizontal plate. In this case, both ends of the lock member extend to the rail main body. Further, the lock member is provided with a lock fitting portion extending downward from both ends. The movable console 18 is locked or unlocked by the lock mechanism through fitting the lock fitting portion of the lock member to the lock fitting hole of the rail main body or detaching the lock fitting portion from the lock fitting hole, on the basis of the vertical movement of the lock member.

Each of the embodiments is provided with a link mechanism transmitting the motion of the operation lever to the lock mechanism, however, the motion of the operation lever may be directly transmitted to the lock member.

In each of the embodiments, the upper portion of the operation lever is exposed in the lever arrangement portion of the movable console, however, the entire operation lever may protrude from the upper surface of the movable console.

The invention claimed is:

1. A vehicular sliding console comprising:
   a console main body that is supported to be movable relative to a vehicle;
   a moving mechanism moving the console main body;
   a lock mechanism locking movement of the console main body by limiting movement of the moving mechanism; and
   an operation lever provided in an upper portion of the console main body and provided for unlocking the console main body locked by the lock mechanism,
   wherein the console main body locked by the lock mechanism is unlocked by operating the operation lever along a moving direction of the console main body, and
   the operation lever is slidable with respect to the console main body, and the lock mechanism has a link mechanism for unlocking the console main body on the basis of a sliding movement of the operation lever.

2. The vehicular sliding console according to claim 1, wherein the console main body is movable along a longitudinal direction of the vehicle, and the console main body locked by the lock mechanism is unlocked by operating the operation lever forward or rearward of the vehicle.

3. The vehicular sliding console according to claim 1, wherein, in the case that the console main body is locked against movement, the operation lever is supported to the console main body in an upright state.

4. The vehicular sliding console according to claim 1, further comprising a fixed console fixed to a floor of the vehicle, wherein the console main body is capable of contacting and separating from the fixed console.

5. The vehicular sliding console according to claim 1, wherein the moving mechanism is provided with an actuation mechanism including the operation lever and the link mechanism, and a guide rail movably supporting the actuation mechanism.

6. The vehicular sliding console according to claim 5, wherein the actuation mechanism includes a lock member having a fitting portion, the guide rail includes a fitting hole to which the fitting portion of the lock member is fined, and the console main body is locked against movement on the basis of fitting between the fitting portion of the lock member and the fitting hole of the guide rail.

7. A vehicular sliding console comprising:
   a console main body that is supported to be movable relative to a vehicle;
   a moving mechanism moving the console main body;
   a lock mechanism locking movement of the console main body by limiting movement of the moving mechanism; and
   an operation lever provided in an upper portion of the console main body and provided for unlocking the console main body looked by to lock mechanism, wherein
   the console main body locked by the lock mechanism is unlocked by operating the operation lever along a moving direction of the console main body, and
   the operation lever is supported so as to be tiltable with respect to the console main body, and the lock mechanism has a link mechanism for unlocking the console main body on the basis of a tilting motion of the operation lever.

* * * * *